United States Patent
Yoo et al.

(10) Patent No.: US 12,160,654 B2
(45) Date of Patent: Dec. 3, 2024

(54) ELECTRONIC DEVICE AND OPERATION METHOD THEREOF

(71) Applicant: SAMSUNG ELECTRONICS CO., LTD., Suwon-si (KR)

(72) Inventors: Byeongwook Yoo, Suwon-si (KR); Gunill Lee, Suwon-si (KR); Wonwoo Lee, Suwon-si (KR); Jiwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 17/985,613

(22) Filed: Nov. 11, 2022

(65) Prior Publication Data
US 2023/0060453 A1    Mar. 2, 2023

Related U.S. Application Data

(63) Continuation of application No. PCT/KR2021/005627, filed on May 4, 2021.

(30) Foreign Application Priority Data

May 11, 2020    (KR) .......................... 10-2020-0056155

(51) Int. Cl.
*H04N 23/611*    (2023.01)
*G06F 3/01*    (2006.01)
(Continued)

(52) U.S. Cl.
CPC ........... *H04N 23/611* (2023.01); *G06F 3/013* (2013.01); *H04N 23/681* (2023.01); *H04N 23/695* (2023.01)

(58) Field of Classification Search
CPC .............. H04N 23/611; H04N 23/681; H04N 23/695; H04N 23/6812; H04N 23/685;
(Continued)

(56) References Cited

U.S. PATENT DOCUMENTS

| 8,736,692 B1 | 5/2014 | Wong et al. |
| 9,423,620 B2 | 8/2016 | Cho |

(Continued)

FOREIGN PATENT DOCUMENTS

| JP | 10-150594 A | 6/1998 |
| JP | 2011-71884 A | 4/2011 |

(Continued)

OTHER PUBLICATIONS

Diaz et al., "Real-time recording and classification of eye movements in an immersive virtual environment," Journal of Vision 13(12):5, pp. 1-14, Oct. 2013.

(Continued)

*Primary Examiner* — Kelly L Jerabek
(74) *Attorney, Agent, or Firm* — Sughrue Mion, PLLC

(57) ABSTRACT

An electronic device worn by a user includes a camera module capable of changing a photographing direction, a motion sensor configured to obtain motion information about the electronic device, an eye-tracking sensor configured to obtain gaze information about eyes of the user, a memory storing one or more instructions, and a processor configured to execute the one or more instructions, wherein the processor is configured to, by executing the one or more instructions, determine the photographing direction based on the gaze information, determine photographing control information for changing the photographing direction of the camera module to obtain an image captured without shaking, based on the motion information, control the camera module to change the photographing, based on the determined photographing control information, and obtain the image captured by the camera module based on the changed photographing direction.

17 Claims, 21 Drawing Sheets

(51) Int. Cl.
*H04N 23/68* (2023.01)
*H04N 23/695* (2023.01)

(58) Field of Classification Search
CPC ....... H04N 23/683; G06F 3/011; G06F 3/012; G06F 3/013
See application file for complete search history.

(56) References Cited

U.S. PATENT DOCUMENTS

| | | | |
|---|---|---|---|
| 9,939,642 | B2 | 4/2018 | Jang et al. |
| 2006/0098087 | A1* | 5/2006 | Brandt ................... H04N 23/61 348/E13.047 |
| 2013/0154918 | A1 | 6/2013 | Vaught et al. |
| 2014/0247286 | A1 | 9/2014 | Chi |
| 2015/0293362 | A1 | 10/2015 | Takahashi et al. |
| 2018/0295290 | A1 | 10/2018 | Nakamura |
| 2021/0082187 | A1* | 3/2021 | Gavriliuc ................ G06F 3/016 |

FOREIGN PATENT DOCUMENTS

| | | |
|---|---|---|
| JP | 2017-142825 A | 8/2017 |
| KR | 10-2013-0059827 A | 6/2013 |
| KR | 10-2015-0122975 A | 11/2015 |
| KR | 10-1571169 B1 | 11/2015 |
| KR | 10-2015-0142516 A | 12/2015 |
| KR | 10-1805749 B1 | 12/2017 |

OTHER PUBLICATIONS

Choi et al., "Eye Tracking System Status and Utilization," Journal of Digital Contents Society vol. 8, No. 1, Dec. 2012, Total 8 pages.
Communication dated Aug. 12, 2021, issued by the International Searching Authority in counterpart International Application No. PCT/KR2021/005627 (PCT/ISA/220, 210, 237).

* cited by examiner

ELECTRONIC DEVICE AND OPERATION METHOD THEREOF

CROSS-REFERENCE TO RELATED APPLICATIONS

This application is a Bypass Continuation of International Application No. PCT/KR2021/005627, filed on May 4, 2021, in the Korean Intellectual Property Receiving Office and claiming priority to Korean Patent Application No. 10-2020-0056155, filed on May 11, 2020, in the Korean Intellectual Property Office, the contents of which are incorporated by reference herein in their entireties.

BACKGROUND

Field

Various embodiments relate to an electronic device configured to capture an image without shaking by using a camera module embedded in the electronic device, and an operating method of the electronic device.

Description of Related Art

According to recent technological advances, various types of wearable electronic devices have been developed. Augmented reality devices enable a user to see both a real scene and a virtual image on a see-through type display module placed in front of the eyes of the user wearing the augmented reality device on his or her face or head. Augmented reality relates to a technology for projecting a virtual image on a real world physical environment space or a real world object to show a single image.

A camera module embedded in an augmented reality device may capture a real scene that a user is looking at. Because the real scene is captured while the user is wearing the augmented reality device on his or her head, there has been a need for research on a method for capturing an image without shaking.

SUMMARY

The disclosure provides an electronic device configured to capture an image without shaking by using a camera module embedded in the electronic device and an operating method of the electronic device.

The disclosure also provides an electronic device configured to capture an image according to a gaze direction of user's eyes and an operating method of the electronic device.

The technical problems to be solved are not limited to the foregoing, and other unstated technical problems may also exist.

In accordance with an aspect of the disclosure, an electronic device worn by a user includes a camera module capable of changing a photographing direction; a motion sensor configured to obtain motion information about the electronic device; an eye-tracking sensor configured to obtain gaze information about eyes of the user; a memory storing one or more instructions; and a processor configured to execute the one or more instructions, wherein the processor is configured to, by executing the one or more instructions: determine the photographing direction based on the gaze information, determine photographing control information for changing the photographing direction of the camera module to obtain an image captured without shaking, based on the motion information, control the camera module to change the photographing direction, based on the determined photographing control information, and obtain the image captured by the camera module based on the changed photographing direction.

The processor may be further configured to, by executing the one or more instructions, identify an eye movement state of the user based on the obtained gaze information, and determine the photographing control information based on the identified eye movement state.

The processor may be further configured to, by executing the one or more instructions, calculate an eye movement acceleration based on the gaze information, and identify the eye movement state based on a result of comparing the calculated eye movement acceleration with a predetermined acceleration threshold value.

The processor may be further configured to, by executing the one or more instructions, determine that the eyes of the user are in a state in which the eyes are not looking at a particular object when the calculated eye movement acceleration is greater than the predetermined acceleration threshold value, and determine the photographing control information based on the motion information and without considering the gaze information.

The processor may be further configured to, by executing the one or more instructions, determine that the eyes of the user are in a state in which the eyes are looking at a particular object when the calculated eye movement acceleration is less than or equal to the predetermined acceleration threshold value, and determine the photographing control information based on the gaze information and the motion information.

The motion information may include information about at least one from among a direction, an angle, and a speed of movement of the electronic device.

The photographing control information may include information about at least one from among a direction, an angle, and a speed of rotation of the camera module.

The processor may be further configured to, by executing the one or more instructions, determine the photographing control information such that the photographing direction of the camera module is changed to an opposite direction of a movement direction of the electronic device, based on the motion information.

In accordance with an aspect of the disclosure, an operating method of an electronic device worn by a user includes determining a photographing direction of a camera module based on gaze information about eyes of the user; determining photographing control information for changing the photographing direction of the camera module to obtain an image captured without shaking, based on motion information about the electronic device; controlling the camera module to change the photographing direction, based on the determined photographing control information; and obtaining the image captured by the camera module based on the changed photographing direction.

The determining of the photographing control information may include identifying an eye movement state of the user based on the obtained gaze information; and determining the photographing control information based on the identified eye movement state.

The identifying of the eye movement state may include calculating an eye movement acceleration based on the gaze information; and identifying the eye movement state based on a result of comparing the calculated eye movement acceleration with a predetermined acceleration threshold value.

The identifying of the eye movement state may further include determining that the eyes of the user are in a state in which the eyes are not looking at a particular object when the calculated eye movement acceleration is greater than the predetermined acceleration threshold value, and when the eyes of the user are in the state in which the eyes are not looking at the particular object, the determining of the photographing control information comprises determining the photographing control information based on the motion information and without considering the gaze information.

The identifying of the eye movement state may further include determining that the eyes of the user are in a state in which the eyes are looking at a particular object when the calculated eye movement acceleration is less than or equal to the predetermined acceleration threshold value, and the determining of the photographing control information may include determining the photographing control information based on the gaze information and the motion information when the eyes of the user are in the state in which the eyes are looking at the particular object.

The determining of the photographing control information may include determining the photographing control information such that the photographing direction of the camera module is changed to an opposite direction of a movement direction of the electronic device, based on the motion information.

The motion information about the electronic device may comprise at least one of a direction, an angle or a speed of movement of the electronic device.

The photographing control information may comprise at least one of a direction, an angle, or a speed of rotation of the camera module.

A non-transitory computer-readable recording medium may store a program that is executed by a processor to perform a method comprising determining a photographing direction of a camera module based on gaze information about eyes of a user; determining photographing control information for changing the photographing direction of the camera module to obtain an image captured without shaking, based on motion information about the electronic device worn by the user; controlling the camera module to change the photographing direction, based on the determined photographing control information; and obtaining the image captured by the camera module based on the changed photographing direction.

DETAILED DESCRIPTION

Figure 1:
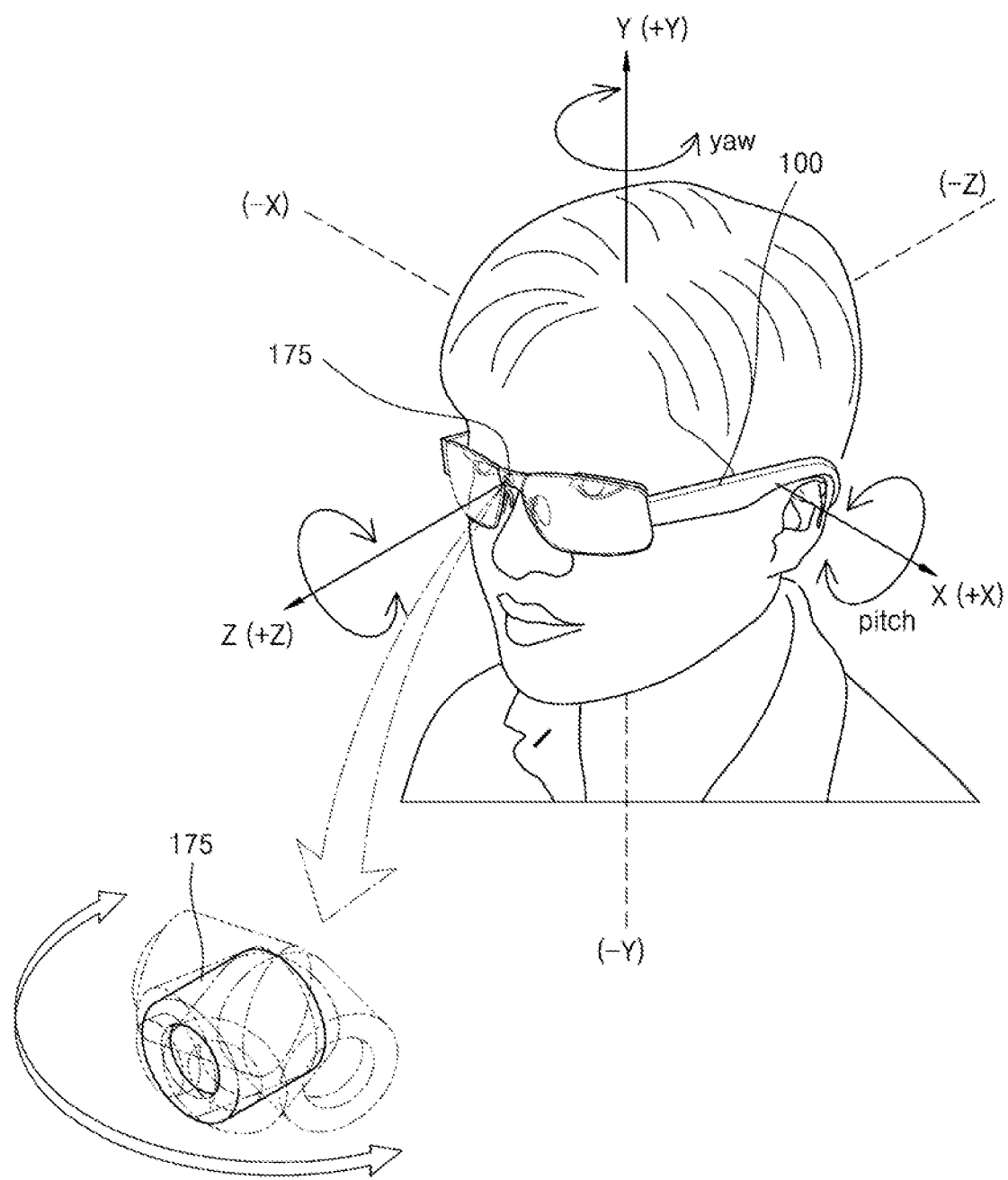
FIG. 1 is a diagram schematically illustrating an embodiment of the disclosure.

Hereinafter, embodiments of the disclosure are described in detail with reference to the accompanying drawings so that a person skilled in the art may easily implement the embodiments of the disclosure. However, the disclosure may be implemented in various different forms and is not limited to the embodiments described herein. In the drawings, to clearly describe the disclosure, any portion irrelevant to the description is omitted, and like reference numerals denote like elements.

General terms which are currently used widely have been selected for use in consideration of their functions in embodiments; however, such terms may be changed according to an intention of a person skilled in the art, precedents, advent of new technologies, etc. Accordingly, the terms used in the disclosure should be defined based on their meanings and overall descriptions of the disclosure, not simply by their names.

Furthermore, while such terms as "first," "second," etc., may be used to describe various components, such components must not be limited to the above terms. The above terms are used only to distinguish one component from another.

The terms used in the disclosure are used merely to describe a particular embodiment and not intended to pose a limitation on the disclosure. As used herein, the singular forms "a," "an" and "the" are intended to include the plural forms as well, unless the context clearly indicates otherwise. Throughout the specification, when a portion is described as being connected to another portion, the portion may be connected directly to another portion, or electrically connected to another portion with an intervening portion therebetween. Further, when a portion "includes" an element, another element may be further included, rather than excluding the existence of other elements, unless otherwise described.

The use of the terms "a" and "an" and "the" and similar referents in the context of describing embodiments (especially in the context of the following claims) are to be construed to cover both the singular and the plural. Also, the steps of all methods described herein can be performed in any suitable order unless otherwise indicated herein or otherwise clearly contradicted by context. The disclosure is not limited to the described order of the steps.

The expressions "according to some embodiments," "according to an embodiment of the disclosure," etc. used throughout the specification are not intended to refer to the same embodiment.

Embodiments may be described in terms of functional block components and various processing steps. Such functional blocks may be realized by any number of hardware and/or software components configured to perform the specified functions. For example, the functional blocks of the disclosure may be implemented by one or more microprocessors or by circuit components for certain functions. Furthermore, the functional blocks of the disclosure may be implemented with various programming or scripting languages. The functional blocks may be implemented in algorithms that are executed on one or more processors. Furthermore, embodiments could employ any number of conventional techniques for electronics configuration, signal processing and/or control, data processing and the like. The words "mechanism," "element," "means," and "configuration" are used broadly and are not limited to mechanical or physical embodiments.

Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

In the disclosure, the augmented reality (AR) may refer to the technology used to show a virtual image in a real world physical environment space or a real world object along with a virtual image.

In addition, the AR device may refer to a device capable of implementing the AR and may include not only glass-type AR devices, which are wearable on the facial area of a user, such as AR glasses, but also a head mounted display apparatus or an AR helmet, etc. which are wearable on the head.

The real scene may refer to a real world scene seen by a user through the AR device and may include a real world object. Moreover, the virtual image may refer to an image generated through an optical engine and may include both of a static image and a dynamic image. Such virtual image may be observed together with a real scene and may refer to an image displaying information about a real object in the real scene or information or control menu, etc. regarding operations of the AR device.

Accordingly, common AR devices may include an optical engine configured to generate a virtual image constituted by light generated from a light source and a waveguide formed of transparent material so that the virtual image generated by the optical engine is guided to eyes of a user and the user can see the virtual image together with a real world scene. As described above, the real world scene also needs to be observable through the AR device. Thus, to guide the light generated by the optical engine to the user's eyes through the waveguide, an optical element configured to change an optical path of light which fundamentally has straightness may be required. The optical path may be changed through reflection by a mirror, etc. or through diffraction by a diffractive optical element (DOE), a holographic optical element (HOE), etc.; however, the disclosure is not limited thereto.

Moreover, according to an embodiment of the disclosure, gaze information may be information obtained by an eye-tracking sensor 160 (FIG. 2) and may include at least one of a gaze direction of eyes of the user, a position of user's pupil, and coordinates of a center point of the pupil.

According to an embodiment of the disclosure, motion information may be information obtained by a motion sensor 150 of the electronic device 100 and may include at least one of a direction, an angle, a speed, and an acceleration of movement of the electronic device 100.

According to an embodiment of the disclosure, photographing control information may be information for changing the photographing direction of the camera module 175 and may include information regarding at least one of a rotation direction, a rotation angle, and a rotation speed of rotation of the camera module 175.

The disclosure will now be described more fully with reference to the accompanying drawings.

FIG. 1 is a diagram schematically illustrating operations of an electronic device according to an embodiment of the disclosure.

The electronic device 100 according to an embodiment of the disclosure may be an augmented reality device. For example, as illustrated in FIG. 1, the electronic device 100 may be a device implemented in the form of glasses which are wearable on the facial area of a user. Moreover, the electronic device 100 may be a device implemented in the form of a goggle, a helmet, a hat, etc., which are wearable on the head of the user. However, the disclosure is not limited thereto.

According to an embodiment of the disclosure, the electronic device 100 worn by the user may obtain an image of the periphery of the electronic device 100 by driving the camera module 175.

When the user wearing the electronic device 100 in his or her daily life intends to capture an image of the periphery by using the camera module 175 mounted on the electronic device 100, it may be not easy for the electronic device 100 worn on the facial area of the user to remain steady without any shaking. When the electronic device 100 is worn on the facial area or head of the user, the electronic device 100 may move along with the movement of the head of the user. When the camera module 175 is fixed to the electronic device 100, the camera module 175 may move along with the electronic device 100 and an image may be captured at the time when the camera module 175 is shaking. In such a case, an image with degraded image quality or an unfocused image may be obtained.

According to an embodiment of the disclosure, the camera module 175 of the electronic device 100 may be mounted on a partial area of the electronic device 100 in a structure rotatable not only vertically or horizontally but also in a direction of a certain angle so that a photographing direction of the camera module 175 may be changed. As illustrated in FIG. 1, the camera module 175 may be embedded in an area between a left eye lens portion and a right eye lens portion in a frame area of the electronic device 100 implemented in the form of glasses, however, the disclosure is not limited thereto.

According to an embodiment of the disclosure, when the electronic device 100 senses a movement, the photographing direction may be changed by rotating the camera module 175 in an opposite direction of a movement direction of the electronic device 100 to compensate for the movement of the electronic device 100. In this manner, an image with minimum shaking may be obtained.

With reference to FIG. 1, when the gaze of the user wearing the electronic device 100 on his or her facial area is directed to the front (in a +Z direction), the camera module 175 may capture an image of the periphery of the electronic device 100 in a photographable angle range in the front direction (+Z direction) of the electronic device 100 according to the gaze direction of the user.

According to an embodiment of the disclosure, when the electronic device 100 senses a movement of the electronic device 100, the electronic device 100 may rotate the camera module 175 in a direction opposite to the movement of the electronic device 100 to change the photographing direction. For example, when the user lowers his or her head while gazing in the front direction, the electronic device 100 may sense a change of pitch of the electronic device 100 around an X axis in a −Y direction. At this time, the electronic device 100 may rotate the camera module 175 in the direction opposite to the movement of the electronic device 100 by controlling the camera module 175 to rotate around the X axis in a +Y direction. Accordingly, the electronic device 100 may obtain an image in focus without degradation of quality.

As illustrated in FIG. 1, when the electronic device 100 is worn by the user, the X axis may be a reference axis horizontally crossing the electronic device 100, the Y axis may be a reference axis vertically crossing the electronic device 100, and the Z axis may be reference axis crossing the electronic device 100 from the front to the rear on a three-dimensional (3D) space. The X axis, the Y axis and the Z axis may be perpendicular to each other.

For example, when the user nods his or her head, such movement may be described as a pitch around the X axis. Moreover, for example, when the user shakes his or her face left to right, this may be described as a yaw around the Y axis. When the user tilts his or her head to either shoulder, this may be described as a roll around the Z axis.

Furthermore, according to an embodiment of the disclosure, the camera module 175 mounted to a front portion of the electronic device 100 may perform the pitch around the X axis, the yaw around the Y axis, and the roll around the Z axis.

Figure 2:
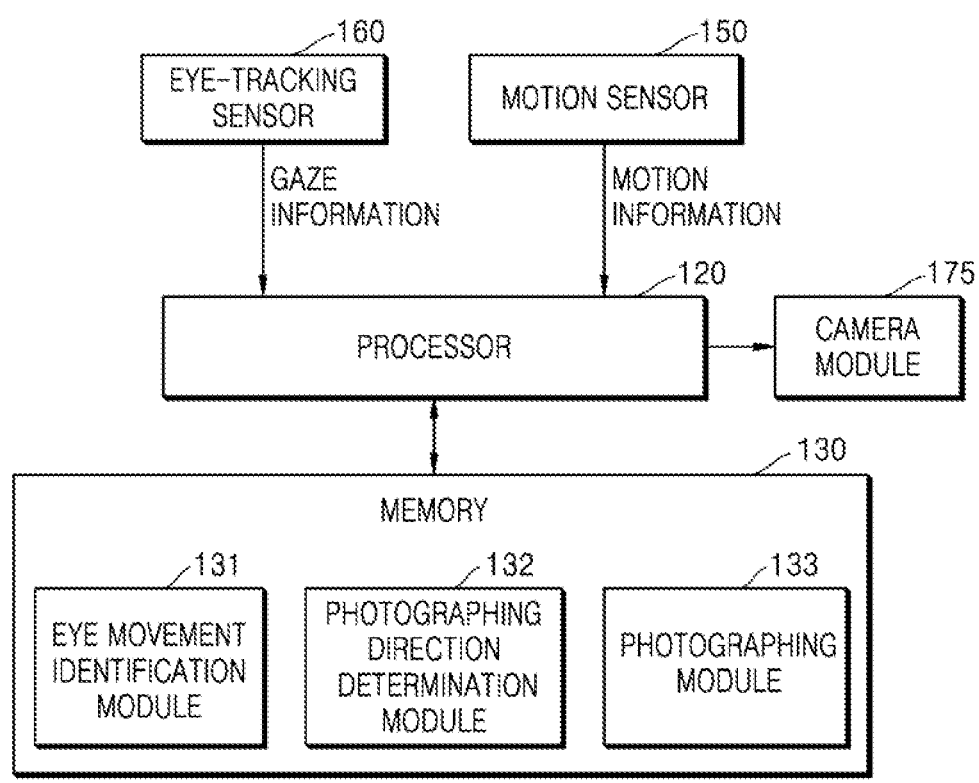
FIG. 2 is a diagram illustrating operations of an electronic device according to an embodiment.

FIG. 2 is a diagram illustrating operations of an electronic device according to an embodiment of the disclosure.

With reference to FIG. 2, the electronic device 100 according to an embodiment of the disclosure may include the camera module 175, an eye-tracking sensor 160, a motion sensor 150, a memory 130, and a processor 120. The processor 120 of the electronic device 100 may execute programs stored in the memory 130 to control the camera module 175, the electronic device 100, the motion sensor 150, etc. in general.

The camera module 175 according to an embodiment of the disclosure may capture an image of the periphery of the electronic device 100. When an application requiring the capturing function is executed, the camera module 175 may obtain an image frame of a static image or a video, etc. through an image sensor. An image captured by the image sensor may be processed by the processor 120 or a separate image processor.

The camera module 175 according to an embodiment of the disclosure may change the photographing direction. The camera module 175 may include a hardware structure capable of changing the photographing direction by panning or tilting the structure. The camera module 175 may rotate not only vertically or horizontally but also in the clockwise or counterclockwise direction around a certain axis.

According to an embodiment of the disclosure, by rotating the camera module 175 by a certain angle in a certain direction through the control by the processor 120, the photographing direction may be changed and an image of the periphery may be captured. Moreover, the camera module 175 may be rotated in a certain direction by the control by the processor 120 and sequentially capture images of the periphery of the electronic device 100.

The eye-tracking sensor 160 according to an embodiment of the disclosure may detect gaze information of the eyes of the user. According to an embodiment of the disclosure, the gaze information may include at least one from among a gaze direction of the user's eyes, a position of pupils of the user's eyes, and coordinates of the centers of the pupils.

The eye-tracking sensor 160 may provide light to the eye of the user (the left eye or the right eye) and sense the quantity of light reflected from the eye of the user. The eye-tracking sensor 160 may detect a gaze direction of the user's eyes, a position of pupils of the user's eyes, coordinates of the centers of the pupils, etc. based on the sensed quantity of light.

The eye-tracking sensor 160 may provide light to the user's eyes and capture an image of the user's eyes. The eye-tracking sensor 160 may detect a gaze direction of the user's eyes, a position of pupils of the user's eyes, coordinates of the centers of the pupils, etc. based on the captured image of user's eyes.

According to an embodiment of the disclosure, the eye-tracking sensor 160 may obtain gaze information of the user by sensing the eyes of the user wearing the eye-tracking sensor 160 at a predetermined time interval.

The motion sensor 150 according to an embodiment of the disclosure may obtain motion information by sensing movements of the electronic device 100. The motion information may include at least one from among a direction, angle, speed, and acceleration of the movement of the electronic device 100.

The motion sensor 150 may be an inertial measurement unit (IMU). The IMU may be a combination of sensors configured to sense movements of an object in a 3D space, e.g., changes in position and orientation. For example, the combination of sensors may include an accelerometer, an angular speedometer, a magnetometer, and a gyroscope.

The motion sensor 150 may include at least one of an acceleration sensor, a magnetic sensor, and a gyroscope sensor.

According to an embodiment of the disclosure, the motion sensor 150 may obtain the motion information by sensing the movement of the electronic device 100 at a predetermined time interval.

The memory 130 according to an embodiment of the disclosure may store a program to be executed by the processor 120 and store data input to the electronic device 100 or output from the electronic device 100.

The memory may include at least one storage medium from a flash memory type storage medium, hard disk type storage medium, multimedia card micro type storage medium, card type memory (e.g., SD or XD memory, etc., random access memory (RAM), static RAM (SRAM), read-only m (ROM), electrically erasable programmable ROM (EEPROM), programmable ROM (PROM), magnetic memory, magnetic disk, and optical disk.

The programs stored in the memory 130 may be classified into a plurality of software modules according to their function, e.g., an eye movement identification module 131, a photographing direction determination module 132, and a photographing module 133; however, the disclosure is not limited thereto, and the memory 130 may store some of the foregoing modules or further include other software modules.

Figure 4A:
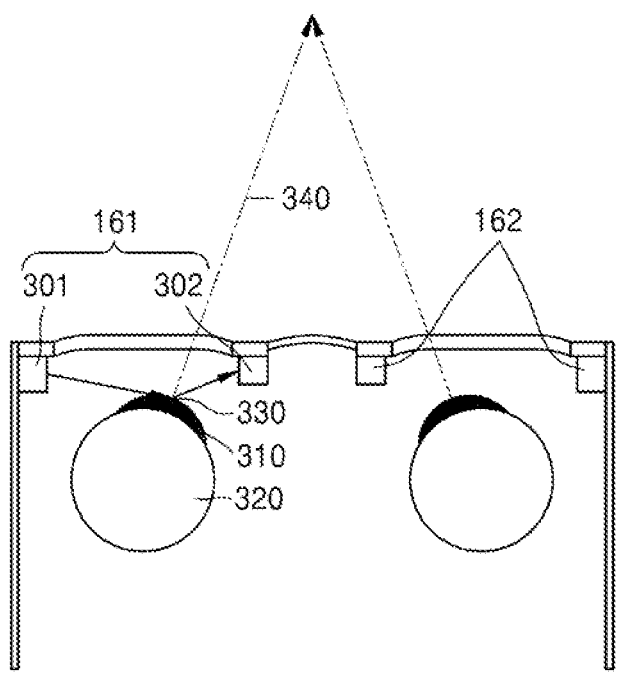
FIG. 4A is a diagram illustrating an example in which gaze information is obtained according to an embodiment.
Figure 4B:
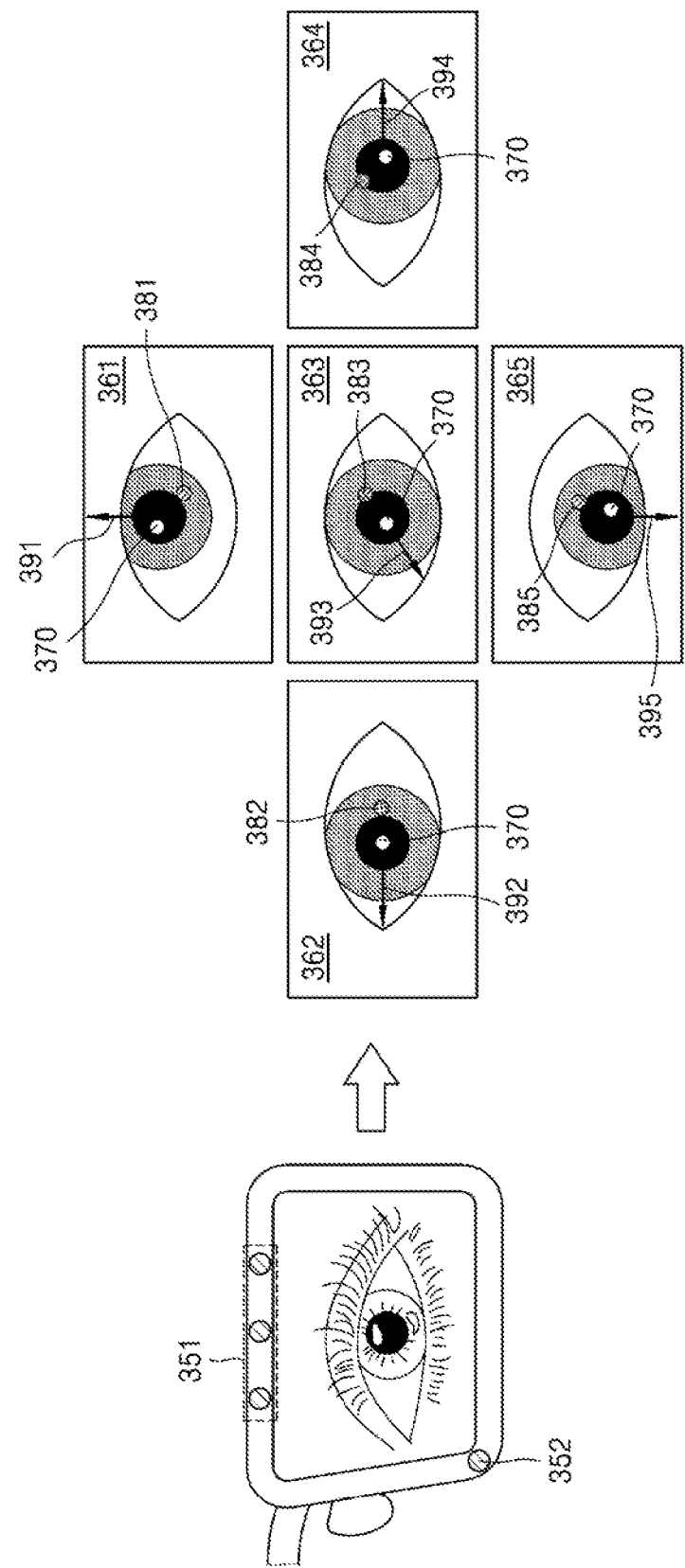
FIG. 4B is a diagram illustrating another example in which gaze information is obtained according to an embodiment.
Figure 4C:
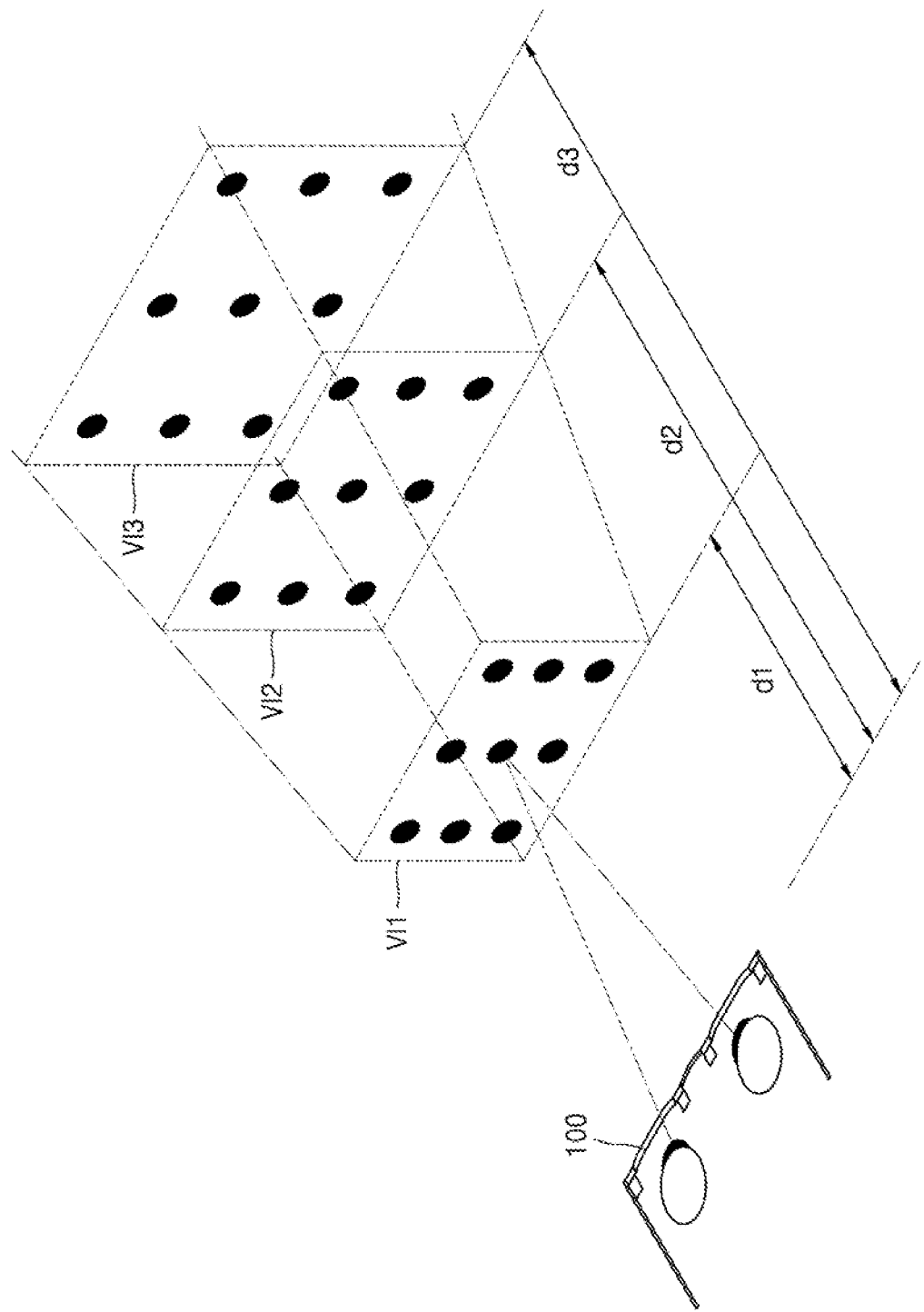
FIG. 4C is a diagram illustrating a method of performing calibration of an eye tracking sensor according to an embodiment.

Moreover, according to an embodiment of the disclosure, when the user gazes at each of points included in virtual images (e.g., VI1, VI2, and VI3 in FIG. 4C) in the process of eye-tracking calibration of FIG. 4C, the memory 130 may store information output from an eye-tracking sensor 161 (gaze information) in a form of a table as reference gaze information. The processor 120 may compare the reference gaze information obtained in the process of eye-tracking calibration prestored in the memory 130 with the gaze information obtained from the eye-tracking sensor 160 to obtain a position or coordinates (2D coordinates x, y) of the gaze of the user.

Moreover, the memory 130 may store a reference acceleration threshold value. The processor 120 may use a preset acceleration threshold value stored in the memory 130 to identify whether the user is looking at a particular object.

Furthermore, the memory 130 may store a speed threshold value, which is a reference value for identifying a state of the eyes (e.g., a fixation state, a pursuit state, etc.) The processor 120 may use the preset speed threshold value stored in the memory 130 to identify whether the eye movement state of the user is the fixation state or the pursuit state.

The processor 120 may control all operations of the electronic device 100. For example, the processor 120 may execute instructions or programs stored in the memory 130 to control the camera module 175, the electronic device 100, the motion sensor 150, etc. in general.

The processor 120 may include at least one hardware from a central processing unit (CPU), a microprocessor, a graphic processing unit (GPU), application specific integrated circuits (ASICs), digital signal processors (DSPs), digital signal processing devices (DSPDs), programmable logic devices (PLDs), and field programmable gate arrays (FPGAs); however, the disclosure is not limited thereto.

The processor 120 may identify the eye movement state of the user by executing the eye movement identification module 131 stored in the memory 130.

The processor 120 may compare the reference gaze information prestored in the memory 130 with the gaze information obtained from the eye-tracking sensor 160 to obtain the position or coordinates (2D coordinates (x, y)) of the gaze of the user. The processor 120 may calculate the speed and acceleration of the eye movement by using the obtained position or coordinates of the gaze. Moreover, the processor 120 may identify the eye movement state of the user based on a result of comparing the speed and acceleration of the eye movement with each of the predetermined speed threshold value and the predetermined acceleration threshold value.

According to an embodiment of the disclosure, the processor 120 may determine that the user's eyes are not looking at a particular object when the eye movement acceleration is greater than the predetermined acceleration threshold value.

According to an embodiment of the disclosure, the state in which the user's eyes are not looking at a particular object may include a saccade state of eyes. The saccade state may refer to a quick movement of user's gaze from one fixed position to another fixed position in an instant.

Furthermore, the processor 120 may determine that the user's eyes are looking at a particular object when the eye movement acceleration is less than or equal to the acceleration threshold value.

According to an embodiment of the disclosure, the state in which the user's eyes are looking at a particular object may be a fixation state or a pursuit state of the eyes. The fixation state may refer to a state in which pupils stay at a particular point during a certain time period when the gaze of the user is fixed on an object and minute movements of the eyes are occurred. The pursuit state may refer to a state of eyes of the user when the gaze follows the movement of an object at which the user's eyes are staring.

According to an embodiment of the disclosure, the processor 120 may determine the eye movement state to be the fixation state when the eye movement acceleration is less than or equal to the acceleration threshold value and the eye movement speed is less than or equal to the speed threshold value. Moreover, the processor 120 may determine the eye movement state to be the pursuit state when the eye movement acceleration is less than or equal to the acceleration threshold value and the eye movement speed is greater than the speed threshold value.

The processor 120 may determine the photographing direction of the camera module 175 by executing the photographing direction determination module 132 stored in the memory 130.

According to an embodiment of the disclosure, the processor 120 may determine the photographing direction of the camera module 175 to be directed in the gaze direction of the user based on the gaze information when the operation of the camera module 175 is started. Alternatively, when the operation of the camera module 175 is initiated, the processor 120 may determine the photographing direction of the camera module 175 based on a default photographing direction.

Furthermore, by executing the photographing direction determination module 132, the processor 120 may determine the photographing control information for changing the photographing direction of the camera module 175 to obtain an image captured without shaking. The photographing control information may include information about at least one from among a direction, an angle, and a speed of rotation of the camera module 175.

According to an embodiment of the disclosure, the processor 120 may determine the photographing control information based on the motion information of the electronic device 100 so that the photographing direction of the camera module 175 is changed to a direction opposite to the movement direction of the electronic device 100.

Moreover, according to an embodiment of the disclosure, the processor 120 may determine the photographing control information based on the eye movement state of the user by executing the photographing direction determination module 132.

When it is determined by the eye movement identification module 131 that the eyes of the user are looking at a particular object, the processor 120 may determine the photographing control information based on the gaze information and the motion information of the electronic device 100.

When it is determined by the eye movement identification module 131 that the eyes of the user are not looking at a particular object, the processor 120 may determine the photographing control information based on the motion information of the electronic device 100 without considering the gaze information.

The processor 120 may capture an image of the periphery of the electronic device 100 through the camera module 175 by executing the photographing module 133 stored in the memory 130.

The processor 120 may capture an image of the periphery of the electronic device 100 based on the photographing direction determined by the photographing direction determination module 132.

According to an embodiment of the disclosure, the processor 120 may change the photographing direction of the camera module 175 based on the photographing control information to capture an image of the periphery of the electronic device 100. Moreover, the processor 120 may capture an image of the periphery of the electronic device 100 while changing the photographing direction of the camera module 175 by a certain angle based on the photographing control information.

Figure 3:
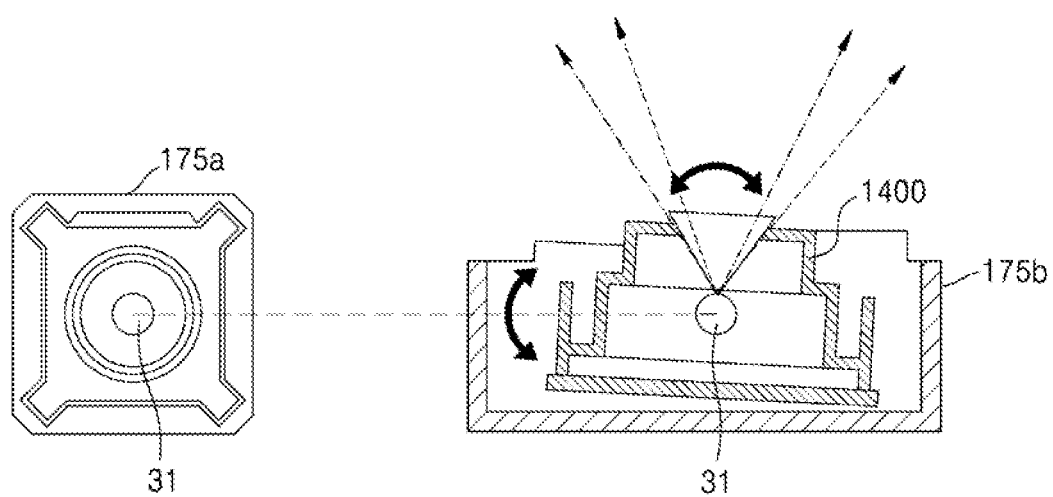
FIG. 3 is a diagram illustrating an example in which a camera module in an electronic device is rotated, according to an embodiment.

FIG. 3 is a diagram illustrating an example in which a camera module in an electronic device is rotated, according to an embodiment of the disclosure.

FIG. 3 is a diagram schematically illustrating a structure of an upper portion 175a and a lateral portion 175b of the camera module 175 embedded in the electronic device 100; however, the disclosure is not limited thereto.

With reference to FIG. 3, the camera module 175 may be mounted onto the electronic device 100 and have a structure in which the camera module 175 may be panned or tilted by a certain angle in a certain direction with respect to the a rotation center 31. Accordingly, the camera module 175 may be tilted in a certain direction around the rotation center 31 by a certain angle or may rotate in the clockwise or counterclockwise direction.

According to an embodiment of the disclosure, as illustrated in FIG. 1, when the camera module 175 is embedded in the front portion of the electronic device 100, the camera module 175 may rotate around the X axis, the Y axis, or the Z axis of the electronic device 100 worn by the user.

FIG. 3 illustrates an example of the camera module 175; however, the disclosure is not limited thereto, and the camera module 175 may be mounted onto the electronic device 100 and have a rotatable structure to change the photographing direction.

FIG. 4A is a diagram illustrating an example in which gaze information is obtained according to an embodiment of the disclosure.

FIG. 4A illustrates a method of tracking the gaze of the user based on the quantity of reflected light from the eyes of the user.

According to an embodiment of the disclosure, the electronic device 100 may include a first eye-tracking sensor 161 configured to track the gaze of one eye and a second eye-tracking sensor 162 configured to track the gaze of the other eye. As the first eye-tracking sensor 161 and the second eye-tracking sensor 162 may have the same structure and operate in the same manner, FIG. 4A is described focusing on the first eye-tracking sensor 161.

With reference to FIG. 4A, the first eye-tracking sensor 161 according to an embodiment of the disclosure may include a lighting portion 301 configured to provide light to the user's eyes and a sensing portion 302 configured to sense the light. The lighting portion 301 may include a light source providing light and a scanning mirror controlling a direction of light provided from the light source. The scanning mirror may control the direction of light provided from the light source to be directed toward the eyes 320 of the user (e.g., pupils 310). The scanning mirror may include a structure capable of mechanically changing a reflection angle by reflecting the light provided from the light source so that the light is directed towards the eyes 320 of the user and may scan an area including the pupils 310 by using the light provided from the light source according to the changed reflection angle.

The sensing portion 302 may sense light reflected from the eyes 320 of the user and measure the quantity of the sensed light. For example, when the light is reflected from the center of the pupils 310 of the user, the quantity of light sensed by the sensing portion 302 may be the maximum quantity. Accordingly, when the quantity of light sensed by the sensing portion 302 is the maximum quantity, the first eye-tracking sensor 161 may determine a direction 340 of the gaze of the user based on a point 330 at which the light is incident on and reflected from the user's eyes. For example, when the quantity of light is the maximum quantity, the first eye-tracking sensor 161 may determine the direction 340 connecting the point 330 at which the light is incident on and reflected from the user's eyes with the center point of the eyes 320 of the user to be the direction of the gaze of the user's eye (e.g., the left eye of the user.)

Moreover, the second eye-tracking sensor 162 may also determine the direction of the gaze of the user's eye (e.g., the right eye) in the same manner described with reference to FIG. 4A.

According to an embodiment of the disclosure, the processor 120 may obtain the gaze information of the left or right eye from one of the first eye-tracking sensor 161 and the second eye-tracking sensor 162 and use the obtained gaze information when determining the photographing direction or the photographing control information.

FIG. 4B is a diagram illustrating another example in which gaze information is obtained according to an embodiment of the disclosure. The first eye-tracking sensor 161 according to an embodiment may include a lighting portion 351 and a capturing portion 352.

FIG. 4B illustrates a method of tracking the gaze of the user based on the position of reflected light from the eyes of the user.

The lighting portion 351 according to an embodiment of the disclosure may include an infrared light-emitting diode (IR LED), etc. As illustrated in FIG. 4B, the lighting portion 351 may include a plurality of LEDs respectively arranged at different positions. The lighting portion 351 may provide light to the user's eyes (e.g., infrared light) when capturing an image of the user's eyes. As light is provided to the user's eyes, reflected light may be generated from the user's eyes.

Moreover, the capturing portion 352 may include at least one camera and the at least one camera may include an IR camera. The electronic device 100 may use an image of user's eyes captured by the capturing portion 352 to track the gaze of the user's eye (e.g., the left eye of the user). For example, the first eye-tracking sensor 161 may track the gaze of the user by detecting the pupil and the reflected light from the image of user's eyes. The first eye-tracking sensor 161 may detect the position of the pupil and the position of the reflected light of the image of the user's eyes and determine the gaze direction of the user's eyes based on a relation between the position of the pupil and the position of the reflected light.

For example, the first eye-tracking sensor 161 may detect pupils 370 and reflected light 381 from a captured first eye image 361 and determine a gaze direction 391 of eyes of the user based on a relation between the position of the pupils 370 and the position of the reflected light 381. In the same manner, the pupils 370 and reflected light 382, 383, 384, and 385 may be detected from each of second to fifth eye images 362, 363, 364, and 365, and based on a relation between the position of the pupils 370 and the position of the reflected light, gaze directions 392, 393, 394, and 395 of the user's eyes may be determined.

Moreover, the second eye-tracking sensor 162 may also determine the direction of the gaze of the user's eye (e.g., the right eye) in the same manner described with reference to FIG. 4B.

According to an embodiment of the disclosure, the processor 120 obtain the gaze information of the left or right eye from one of the first eye-tracking sensor 161 and the second eye-tracking sensor 162 and may use the obtained gaze information when determining the photographing direction or the photographing control information.

FIG. 4C is a diagram illustrating a method of performing calibration of an eye tracking sensor according to an embodiment of the disclosure.

When the user uses the electronic device 100 for the first time, to accurately measure the gaze of the left eye and the right eye of the user, calibration of the first eye-tracking sensor 161 and the second eye-tracking sensor 162 may be performed. The electronic device 100 may output virtual images VI1, VI2, and VI3 each having different depths (e.g., d1, d2, and d3) represented by a plurality of points (generally, nine points) to induce the user to gaze at each of the plurality of points.

When the user gazes at each point included in the virtual images VI1, VI2, and VI3, the electronic device 100 may prestore information output from the eye-tracking sensor 161 in the form of a table as reference gaze information.

The processor 120 of the electronic device 100 may compare the reference gaze information prestored in the memory 130 with the gaze information output from the eye-tracking sensor 161 to determine the position or coordinates (2D coordinates (x, y)) of the gaze of the user. The processor 120 may use the gaze information output from the first eye-tracking sensor 161 to determine coordinates of the left eye. The processor 120 may use the gaze information output from the second eye-tracking sensor 162 to determine coordinates of the right eye.

According to an embodiment of the disclosure, the processor 120 of the electronic device 100 may use the coordinates of the gaze of either eye to calculate the eye movement speed and acceleration.

Figure 5:
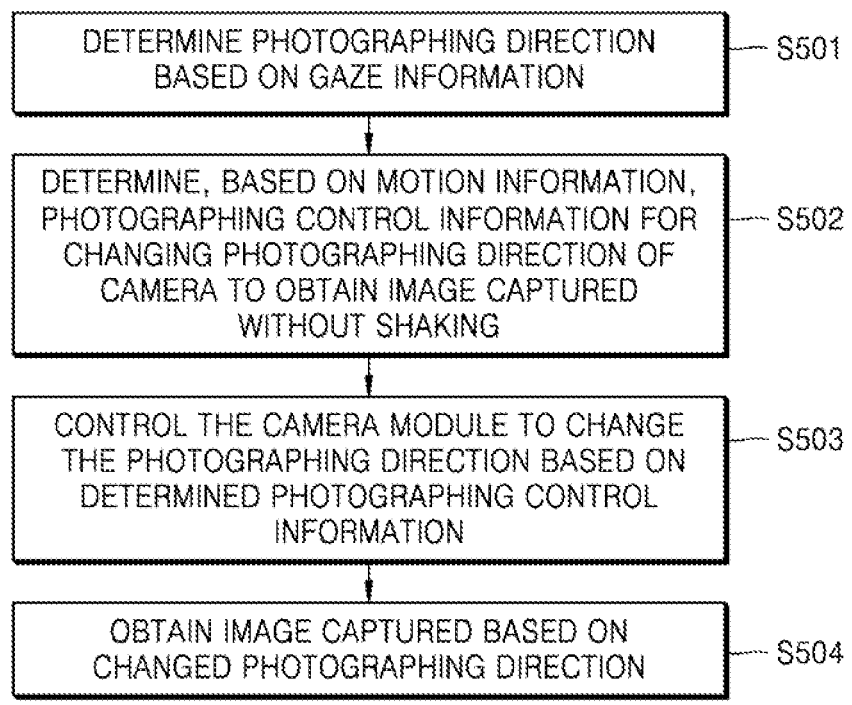
FIG. 5 is a flowchart illustrating an operation of changing a photographing direction of a camera module according to an embodiment.
Figure 6:
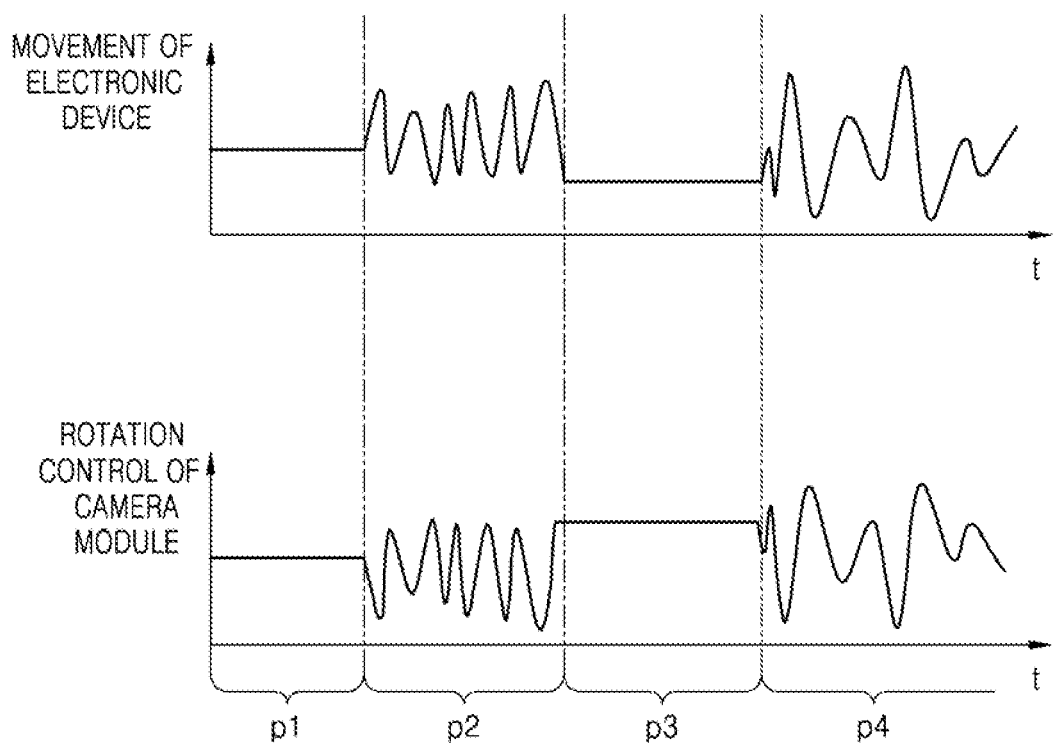
FIG. 6 is a diagram illustrating control of a photographing direction according to an embodiment.

FIG. 5 is a flowchart illustrating an operation of changing a photographing direction of a camera module according to an embodiment of the disclosure. FIG. 6 is a diagram illustrating control of a photographing direction according to an embodiment of the disclosure. FIG. 6 illustrates the method of FIG. 5.

In operation S501 of FIG. 5, the electronic device 100 may determine the photographing direction based on the gaze information.

According to an embodiment of the disclosure, the processor 120 of the electronic device 100 may obtain the gaze information from the eye-tracking sensor 160 (FIG. 1). The gaze information may include at least one of a gaze direction of the user's eyes, a position of pupils, and coordinates of center points of the pupils.

When the user is wearing the electronic device 100 on his or her facial area or head, the processor 120 may determine the photographing direction based on the gaze information obtained from the eye-tracking sensor 160 so that the camera module 175 captures a real scene at which the user is gazing.

The processor 120 may determine the photographing direction so that the camera module 175 is directed in the user's gaze direction when the operation of the camera module 175 is started.

In operation S502 of FIG. 5, the photographing control information for changing the photographing direction of the camera to obtain an image captured without shaking may be determined based on the motion information.

The electronic device 100 may obtain the motion information from the motion sensor 150 (FIG. 1). The motion information may include at least one of a direction, angle, speed, and acceleration of the movement of the electronic device 100.

When the motion information of the electronic device 100 is obtained from the motion sensor 150, the processor 120 may determine the photographing control information so that the camera module 175 rotates in a direction and by an angle to compensate for the movement of the electronic device 100, i.e., in a direction opposite to the movement direction of the electronic device 100 by the same angle the electronic device 100 has moved. According to an embodiment of the disclosure, the photographing control information may include information about at least one of a direction, an angle, and a speed of rotation of the camera module 175.

For example, when the movement of the electronic device 100 around the Y axis in the −X direction by 5 degrees is detected, the processor 120 may determine the photographing control information including a rotation direction and a rotation angle of the camera module 175 (e.g., rotation around the Y axis in the +X direction by 5 degrees).

With reference to FIG. 6, when the electronic device 100 controls the rotation of the camera module 175 considering the movement of the electronic device 100, a control signal may be determined to rotate the camera module 175 by an inverse value of a movement signal value of the electronic device 100. For example, when no movement of the electronic device 100 is detected in time sections p1 and p3, the camera module 175 may not be rotated, and when movement of the electronic device 100 is detected in time sections p2 and p4, a rotation control signal may be determined to be an inverse value of the movement signal value.

In operation S503 of FIG. 5, the electronic device 100 may control the camera module to change the photographing direction based on the determined photographing control information. The processor 120 may change the photographing direction by controlling the camera module 175 to rotate in a rotation direction and by a rotation angle included in the determined photographing control information.

In operation S504 of FIG. 5, the electronic device 100 may obtain an image captured based on the changed photographing direction. The processor 120 may obtain an image (e.g., a static image, video or a panorama image, etc.) by capturing an image of the periphery of the electronic device 100 through the camera module 175 which is rotated in the changed photographing direction.

According to an embodiment of the disclosure, when the electronic device 100 the user is wearing on his or her facial area or head is shaking, the electronic device 100 may rotate the camera module 175 to capture and obtain an image with minimum shaking.

Figure 7:
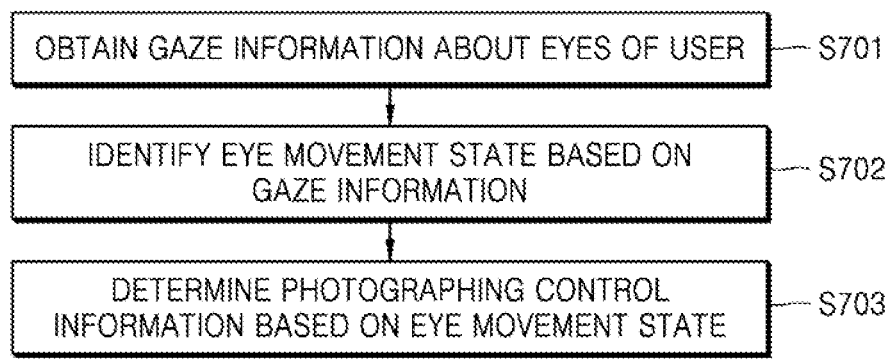
FIG. 7 is a flowchart illustrating an operation of controlling a photographing direction based on an eye movement state according to an embodiment.

FIG. 7 is a flowchart illustrating an operation of controlling a photographing direction based on an eye movement state according to an embodiment of the disclosure.

In operation S701 of FIG. 7, the electronic device 100 may obtain the gaze information of the user's eyes.

The processor 120 of the electronic device 100 may obtain the gaze information including at least one of a gaze direction of the user's eyes, positions of pupils, and coordinates of the center points of the pupils through the eye-tracking sensor 160.

In operation S702 of FIG. 7, the electronic device 100 may identify the eye movement state based on the gaze information.

The processor 120 may execute the eye movement identification module 131 (FIG. 2) to identify the eye movement state by using the gaze information obtained from the eye-tracking sensor 160.

According to an embodiment of the disclosure, the eye movement state may be a state in which the user's eyes are looking at a particular object or a state in which the user's eyes are not looking at a particular object.

For example, the state in which the user's eyes are looking at a particular object may be the fixation state of the eyes in which the user's eyes are fixed on an object and only very minute movement occurs or the pursuit state of the eyes in which the user's eyes follow an object when the object is moving. Furthermore, the state in which the eyes are not looking at a particular object may be the saccade state of the eyes in which the gaze of the user quickly moves from one fixed position to another fixed position.

As described with reference to FIG. 4C, the processor 120 may compare the reference gaze information prestored in the memory 130 with the gaze information obtained from the eye-tracking sensor 160 to determine the position (2D coordinates (x, y)) of the gaze of the user. The processor 120 may calculate the eye movement speed and acceleration by using the position change amount of user's gaze during a certain time period.

The processor 120 may determine whether the eyes are looking at a particular object (e.g., the fixation state or the pursuit state of the eyes) or not (e.g., the saccade state of the eyes) based on the calculated eye movement acceleration.

In operation S703 of FIG. 7 the electronic device 100 may determine the photographing control information based on the eye movement state.

According to an embodiment of the disclosure, when the eyes of the user are determined to be in the state where they are looking at a particular object, the processor 120 may determine the photographing control information based on both of the gaze information of the user and the motion information of the electronic device.

For example, when the eyes of the user are in the fixation state, the processor 120 may adjust the photographing direction of the camera module 175 so that the movement of the electronic device 100 is sensed and an image taken without shaking is obtained while the camera module 175 is directed towards an object at which the user is gazing.

Furthermore, for example, when the eyes are in the pursuit state where the gaze of the user follows the movement of the object, the processor 120 may change the photographing direction so that the camera module 175 may capture an image of the moving object at which the user is gazing while adjusting the photographing direction of the camera module 175 to obtain an image taken without shaking according to a result of sensing the movement of the electronic device 100.

According to an embodiment of the disclosure, the processor 120 may set a first weight regarding the gaze information of the user and a second weight regarding the motion information of the movement of the electronic device when considering both of the gaze information of the user and the motion information of the electronic device.

For example, the processor 120 may set the first weight to be higher than the second weight so that the camera module 175 rotates firstly in the gaze direction of the user. Alternatively, for example, the processor 120 may set the second weight to be higher than the first weight so that the camera module 175 rotates according to the motion information of the electronic device rather than the gaze information of the user.

In addition, according to an embodiment of the disclosure, when the eyes of the user are determined to be in the state where they are not looking at a particular object, the processor 120 may determine the photographing control information based on the motion information of the electronic device.

For example, when the eyes of the user are in the saccade state where they are not looking at a particular object, the processor 120 may determine the photographing control information of the camera module 175 to obtain an image taken without shaking according to a result of sensing the movement of the electronic device 100.

For example, when the user averts his or her eyes to gaze at a second object from a first object, in a time interval of the gaze movement from the first object to the second object, the processor 120 may identify the saccade state in which the gaze of the user moves quickly. In this occasion, the processor 120 may adjust the photographing direction of the camera module 175 to obtain an image taken without shaking according to a result of sensing the movement of the electronic device 100 without considering the movement of the user's gaze.

Figure 8A:
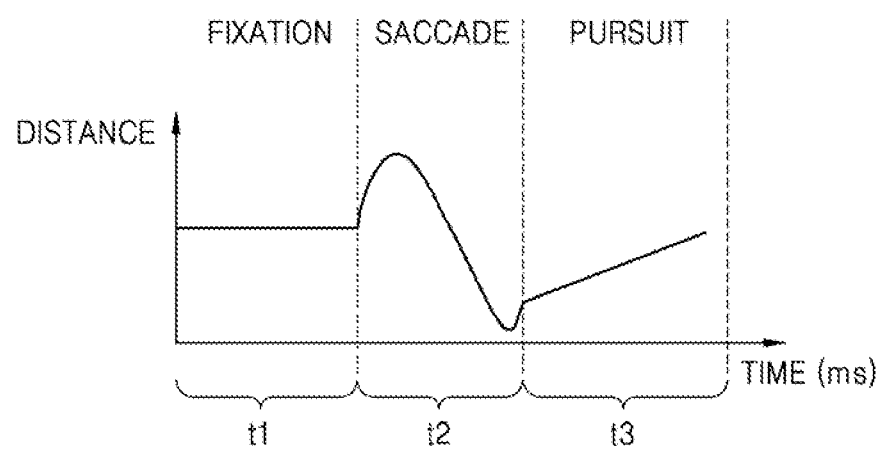
FIG. 8A is a diagram illustrating a movement distance according to an eye movement state.
Figure 8B:
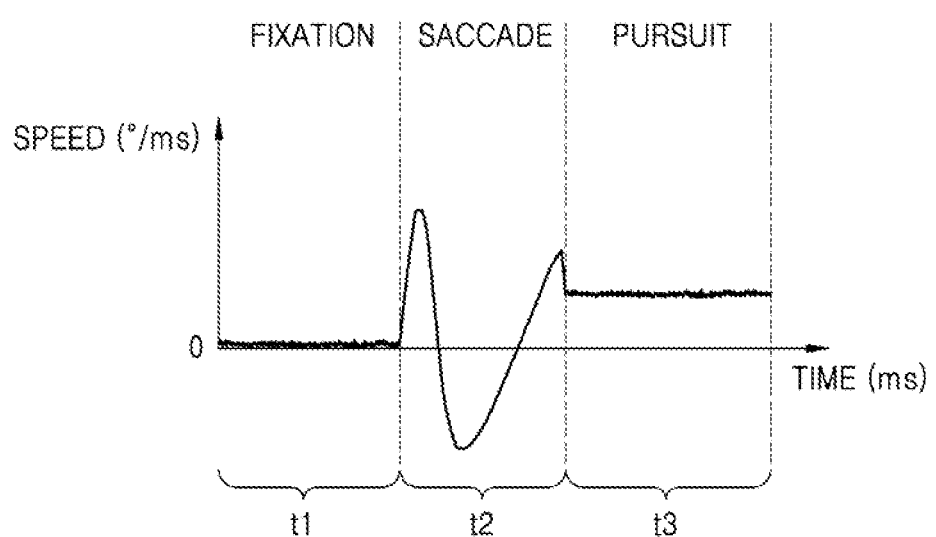
FIG. 8B is a diagram illustrating a movement speed of eyes according to an eye movement state.
Figure 8C:
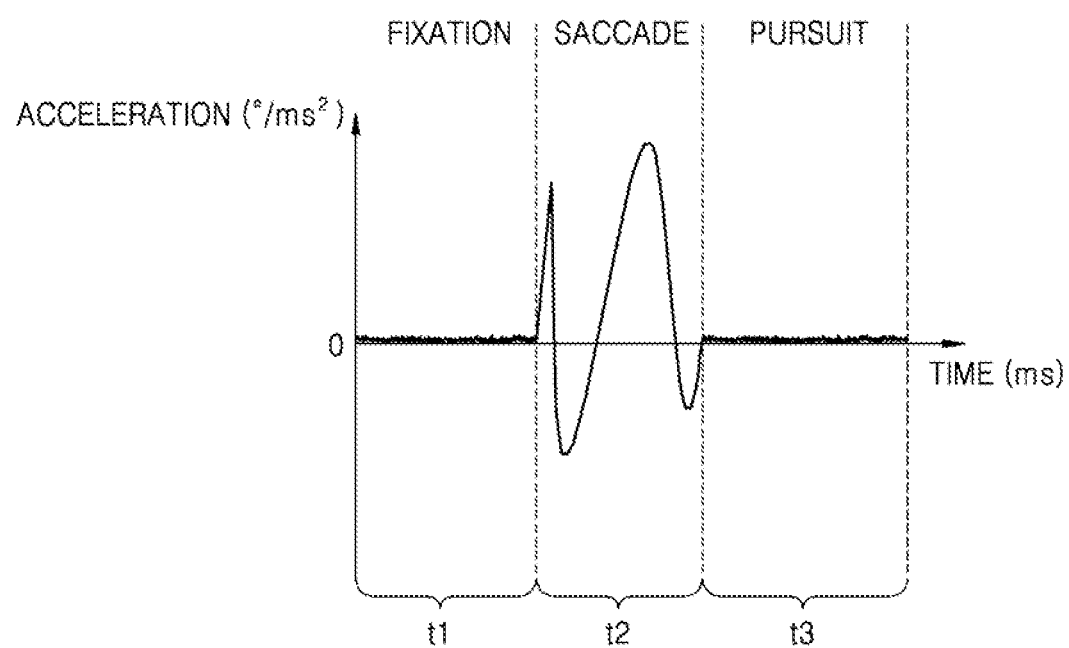
FIG. 8C is a diagram illustrating a movement acceleration of eyes according to an eye movement state.

FIG. 8A is a diagram illustrating a movement distance according to an eye movement state. FIG. 8B is a diagram illustrating a movement speed of eyes according to an eye movement state. FIG. 8C is a diagram illustrating a movement acceleration of eyes according to an eye movement state.

FIGS. 8A to 8C are graphs showing an eye movement distance, a movement speed, and a movement acceleration in a time section t1, time section t2, and time section t3.

The movement distance from the reference point in FIG. 8A may be calculated by a distance from a certain reference point to the coordinates of the center point of the pupil. The eye movement speed in FIG. 8B may be calculated by an eye position change amount during a certain time period. The eye movement acceleration in FIG. 8C may be calculated by an eye movement speed change amount during a certain time period.

When the eye movement state is the fixation state (time section t1), the distance may be fixed within a certain range (FIG. 8A), the movement speed may be close to 0°/ms (FIG. 8B), and the movement acceleration may also be close to $0°/ms^2$ (FIG. 8C).

When the eye movement state is the saccade state (time section t2), the distance change amount may be beyond a certain range during the t2 time section (FIG. 8A) and the movement speed and acceleration may also be calculated to be variable values beyond a certain range (FIGS. 8B and 8C).

Furthermore, when the eye movement state is the pursuit state (time section t3), the distance may vary consistently during the time section t3, the movement speed may be close to uniform velocity (FIG. 8B), and the movement acceleration may be close to $0°/ms^2$ (FIG. 8C).

According to an embodiment of the disclosure, the eye movement identification module 131 stored in the memory 130 may include an algorithm capable of identifying the eye movement state based on the eye movement speed and the movement acceleration. The processor 120 of the electronic device 100 may execute the eye movement identification module 131 to identify the eye movement state based on calculation results of the eye movement speed and movement acceleration by using the gaze information obtained through the eye-tracking sensor 160.

Figure 9:
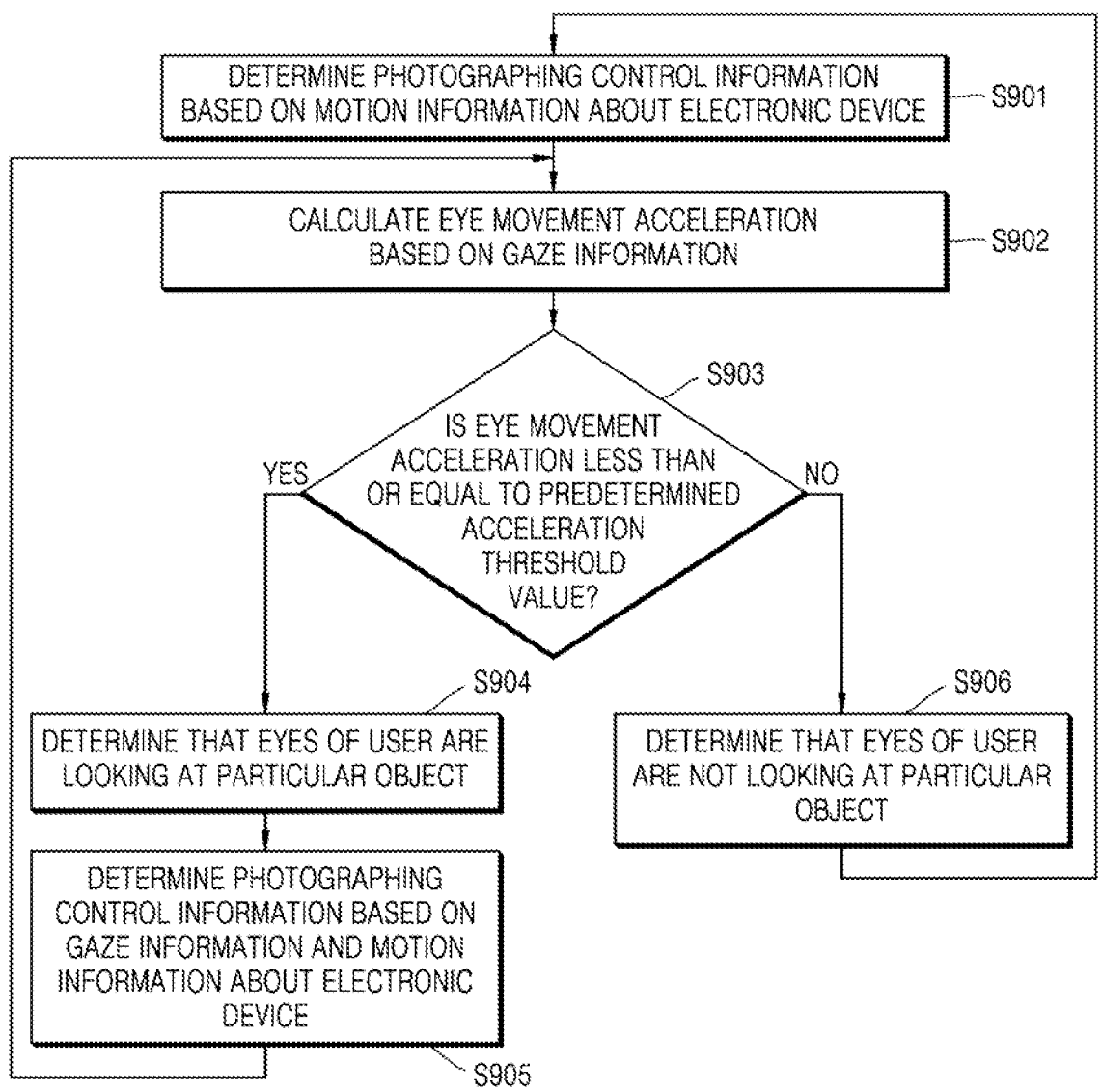
FIG. 9 is a flowchart illustrating a method of identifying an eye movement state according to an embodiment.

FIG. 9 is a flowchart illustrating a method of identifying an eye movement state according to an embodiment of the disclosure.

The processor 120 of the electronic device 100 may obtain the gaze information including a gaze direction of the user's eyes, position of pupils, and coordinates of the center points of the pupils through the eye-tracking sensor 160. The processor 120 may obtain the gaze information through the eye-tracking sensor 160 at preset time intervals.

Moreover, according to an embodiment of the disclosure, the processor 120 of the electronic device 100 may obtain the motion information through the motion sensor 150 (FIG. 1) when the movement of the electronic device 100 is detected. The motion information may include at least one of a direction, angle, speed, and acceleration of the movement of the electronic device 100.

In operation S901 of FIG. 9, the electronic device 100 may determine the photographing control information based on the motion information of the electronic device.

According to an embodiment of the disclosure, when the motion information of the electronic device 100 is obtained from the motion sensor 150, the processor 120 may determine the photographing control information so that the camera module 175 is rotated in a direction and by an angle to compensate for the movement of the electronic device 100 based on the motion information.

In operation S902 of FIG. 9, the electronic device 100 may calculate the eye movement acceleration based on the gaze information.

According to an embodiment of the disclosure, the electronic device 100 may calculate the eye movement acceleration based on the gaze information obtained through the eye-tracking sensor 160.

The processor 120 of the electronic device 100 may calculate the eye movement speed by calculating the position change amount of pupils over a certain time period based on the position of the pupils of the eyes obtained through the eye-tracking sensor 160. Moreover, the processor 120 may calculate the movement acceleration by calculating the movement speed change amount of the pupils over a certain time period.

In operation S903 of FIG. 9, the electronic device 100 may identify whether the eye movement acceleration is less than or equal to a predetermined acceleration threshold value.

According to an embodiment of the disclosure, the memory 130 of the electronic device 100 may prestore the acceleration threshold value which is a reference value for identifying whether the eyes of the user are looking at a particular object.

The processor 120 of the electronic device 100 may compare the movement acceleration calculated based on the gaze information obtained in operation S901 with the predetermined acceleration threshold value stored in the memory 130.

In operation S904 of FIG. 9, when the eye movement acceleration is less than or equal to the predetermined acceleration threshold value, the electronic device 100 may determine that the user's eyes are looking at a particular object.

When the eye movement acceleration calculated in operation S902 is less than or equal to the prestored acceleration threshold value, the processor 120 may determine that the eyes are looking at a particular object (i.e., in the fixation state or in the pursuit state).

With reference to FIGS. 8A to 8C, when the user's eyes are looking at a fixed object, i.e., in the fixation state, the eye movement may be in a nearly stationary state. In addition, when the user's eyes are looking at a moving object, i.e., in the pursuit state, the eye movement may be in a nearly uniform state of motion. Accordingly, when the eyes are in the fixation state or in the pursuit state, the eye movement acceleration may be calculated close to $0°/ms^2$ and less than or equal to a preset acceleration threshold value.

In operation S905 of FIG. 9, when the eyes of the user are looking at a particular object, the electronic device 100 may determine the photographing control information based on the gaze information and the motion information of the electronic device.

According to an embodiment of the disclosure, when the eyes of the user are determined to be in the state where they are looking at a particular object, the processor 120 may determine the photographing control information so that the photographing direction is changed to a direction in which the user is looking at the particular object. Moreover, when the camera module 175 is directed in a gaze direction of the user, the processor 120 may determine the photographing control information to capture an image without shaking according to a result of sensing the movement of the electronic device 100.

The processor 120 may calculate the eye movement acceleration based on the gaze information obtained through the eye-tracking sensor 160 at preset time intervals (S902). The processor 120 may redetermine, at the preset time intervals, the photographing control information according to the eye movement state identified by calculating the eye movement acceleration.

In operation S906 of FIG. 9, when the eye movement acceleration calculated in operation S902 is greater than the predetermined acceleration threshold value, the electronic device 100 may determine that the user's eyes are not looking at a particular object.

With reference to FIG. 8C, when the eyes are in the saccade state where the gaze of the user moves quickly from one fixed position to another fixed position, the eye movement may be expressed as a motion with variable acceleration. Accordingly, when the calculated eye movement acceleration is greater than the preset acceleration threshold value, the eye movement state may be determined to be the saccade state.

When the eyes of the user are determined to be in the state where they are not looking at a particular object, the processor 120 of the electronic device 100 may determine the photographing control information based on the motion information of the electronic device (S901).

According to an embodiment of the disclosure, with respect to the time section during which the user's eyes are in the saccade state where they are not looking at a particular object, the processor 120 may determine the photographing control information to obtain an image taken without shaking according to a result of sensing the movement of the electronic device 100 without considering the gaze movement of the user.

Figure 10A:
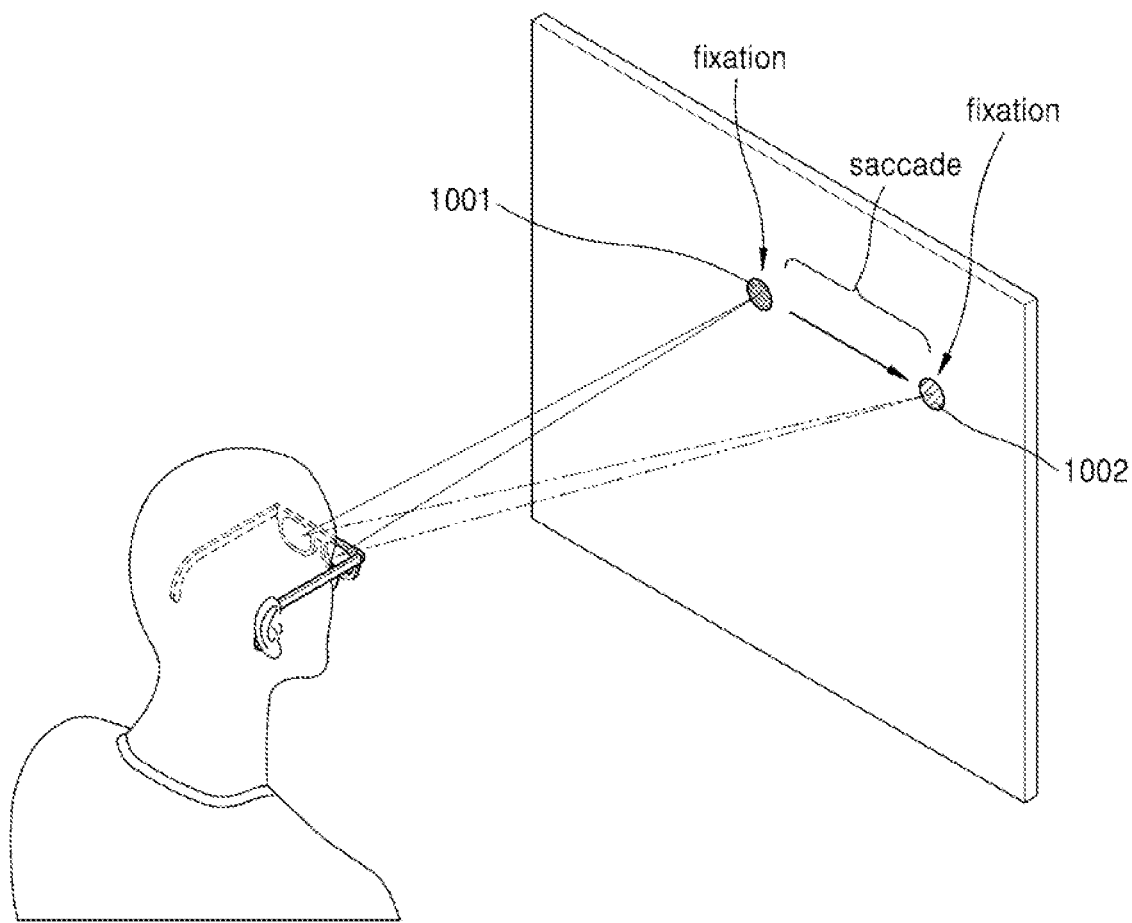
FIG. 10A is a diagram illustrating an example of a gaze movement of a user according to an embodiment.
Figure 10B:
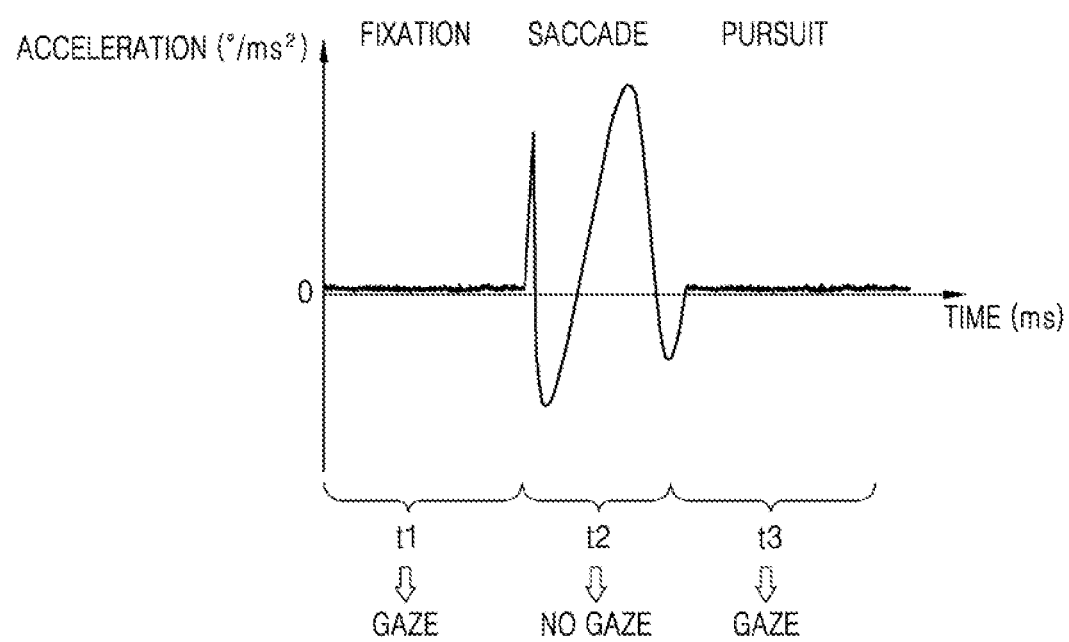
FIG. 10B is a diagram illustrating an example in which an eye movement state is identified based on eye movement acceleration according to an embodiment.

FIG. 10A is a diagram illustrating an example of a gaze movement of a user according to an embodiment of the disclosure. FIG. 10B is a diagram illustrating an example which an eye movement state is identified based on eye movement acceleration according to an embodiment of the disclosure.

FIG. 10A illustrates a case where the user gazes at a first object 1001 first and then after a certain time period, gazes at a second object 1002. FIG. 10B is a graph showing an acceleration value calculated in the case of FIG. 10A.

The processor 120 of the electronic device 100 may identify, after calculating the eye movement acceleration by using the gaze information obtained through the eye-tracking sensor 160, that the acceleration in the time section t1 is close to 0°/ms², i.e., less than or equal to the preset acceleration threshold value. Accordingly, the processor 120 may determine that the user's eyes are looking at a particular object in the time section t1.

Furthermore, the processor 120 may identify, after calculating the eye movement acceleration by using the gaze information obtained through the eye-tracking sensor 160 in the time section t2, that the movement acceleration is greater than the preset acceleration threshold value. Accordingly, the processor 120 may determine that the user's eyes are not looking at a particular object in the time section t2.

Furthermore, the processor 120 may identify, after calculating the eye movement acceleration by using the gaze information obtained through the eye-tracking sensor 160 in the time section t3, that the movement acceleration is close to 0°/ms² i.e., less than the preset acceleration threshold value. Accordingly, the processor 120 may determine that the user's eyes are looking at a particular object in the time section t3.

The processor 120 may determine the photographing control information to adjust the photographing direction based on the motion information of the electronic device 100 in the time section t1 and the time section t3 while the camera module 175 is directed in the gaze direction of the user.

Moreover, the processor 120 may determine the photographing control information based on the motion information of the electronic device 100 in the time section t2 without considering the gaze direction of the user.

Figure 11:
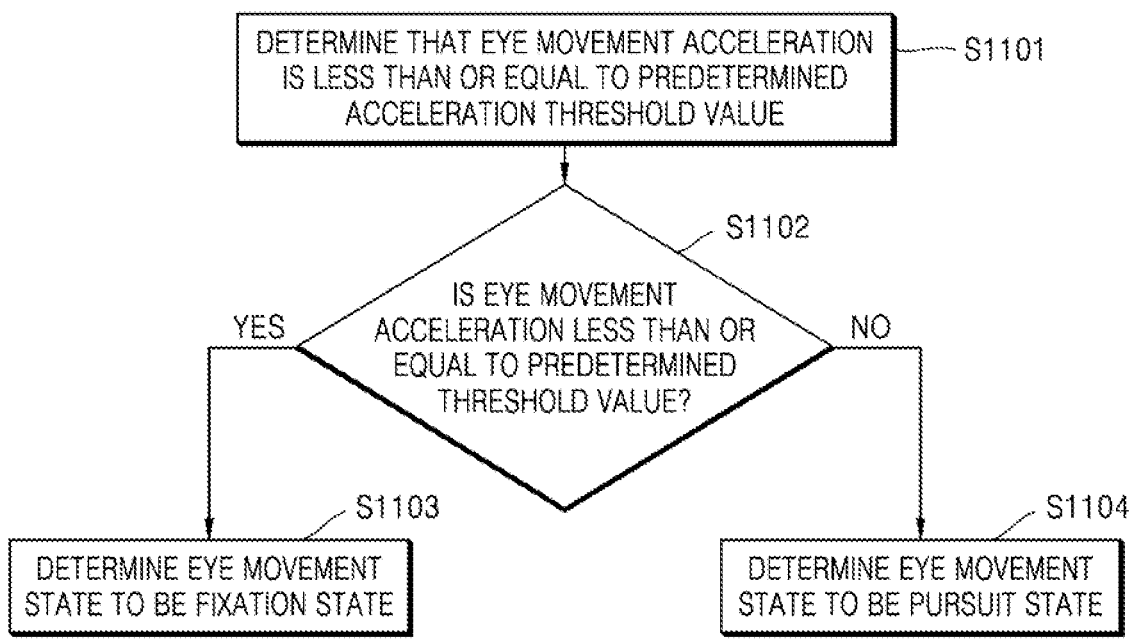
FIG. 11 is a flowchart illustrating a method of identifying an eye movement state according to an embodiment.

FIG. 11 is a flowchart illustrating a method of identifying an eye movement state according to an embodiment of the disclosure.

As the electronic device 100 identifies that the eye movement acceleration is less than or equal to the predetermined acceleration threshold value in operation S1101 of FIG. 11, the electronic device 100 may identify that the eye movement speed is less than or equal to the predetermined speed threshold value in operation S1102.

With reference to FIGS. 8A to 8C, in a section where the eye movement acceleration is close to 0°/ms², i.e., less than or equal to the predetermined acceleration threshold value, the user's eyes may be in the fixation state or in the pursuit state. In both the fixation state and the pursuit state, the eyes are determined to be looking at a particular object.

The processor 120 may identify whether the user's eyes are in the fixation state or in the pursuit state by comparing the movement speed calculated by using the gaze information obtained from the eye-tracking sensor 160 with the speed threshold value, which is a reference speed for identifying the stationary state or the pursuit state of the eyes prestored in the memory 130.

In operation S1103 of FIG. 11, when the eye movement speed is less than or equal to the predetermined speed threshold value, the electronic device 100 may determine the eye movement state to be the fixation state. In operation S1104, when the eye movement speed is greater than the predetermined speed threshold value, the electronic device 100 may determine the eye movement state to be the pursuit state.

With reference to FIG. 8B, when the eyes are in the fixation state, the eye movement speed may be close to 0°/ms² and less than or equal to the predetermined speed threshold value. Moreover, when the eyes are in the pursuit state, the eye movement speed may be greater than the predetermined speed threshold value.

According to an embodiment of the disclosure, when the eyes are in the fixation state or in the pursuit state, the processor 120 may determine the photographing control information so that the camera module 175 may adjust the photographing direction based on the motion information of the electronic device 100 while tracking the gaze direction of the user.

Figure 12A:
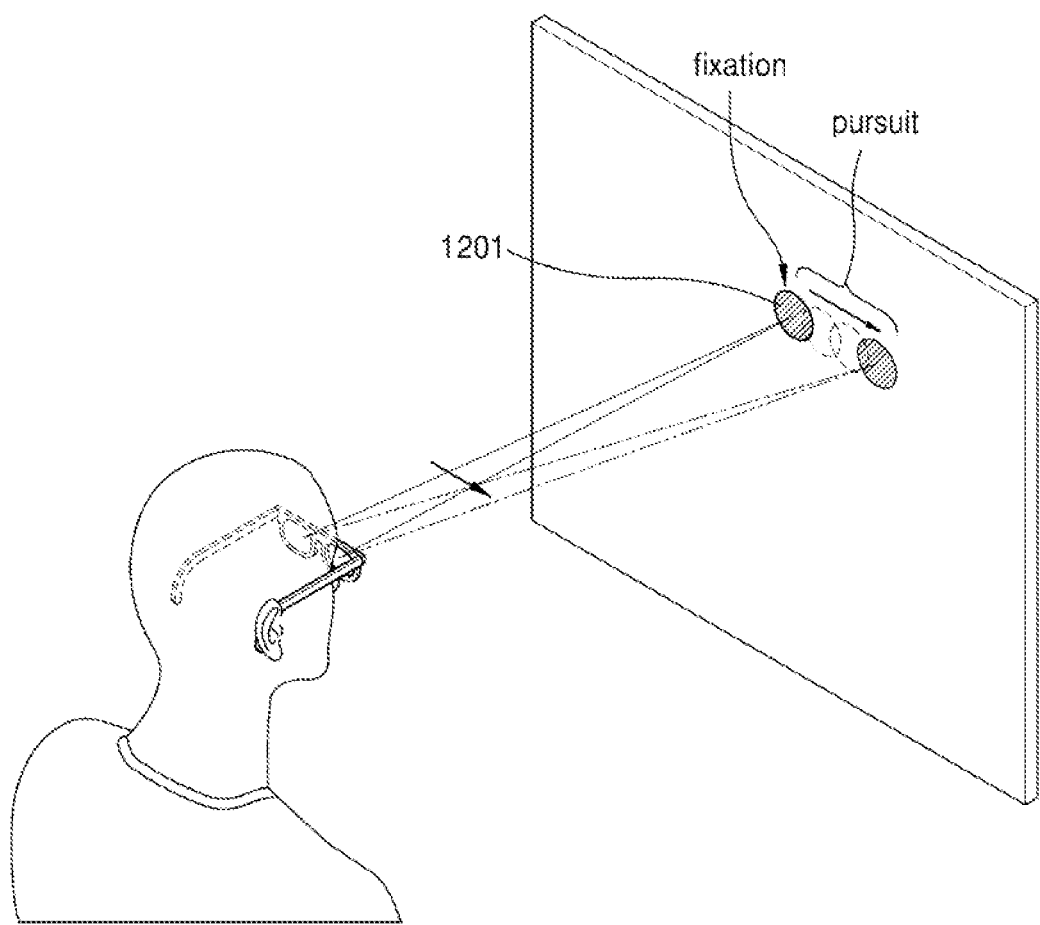
FIG. 12A is a diagram illustrating an example of a gaze movement of a user according to an embodiment
Figure 12B:
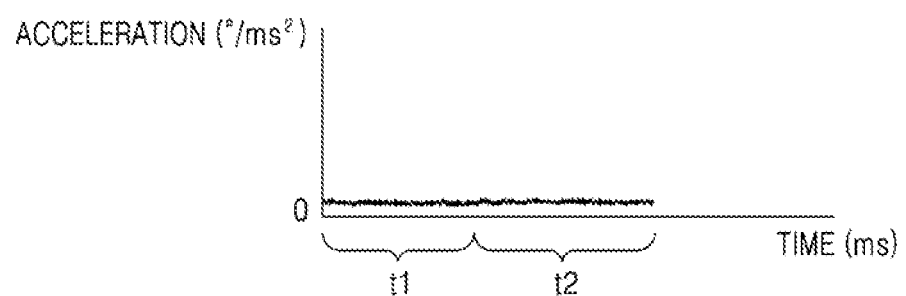
FIG. 12B is a diagram illustrating an example in which an eye movement state is identified based on eye movement acceleration according to an embodiment.
Figure 12C:
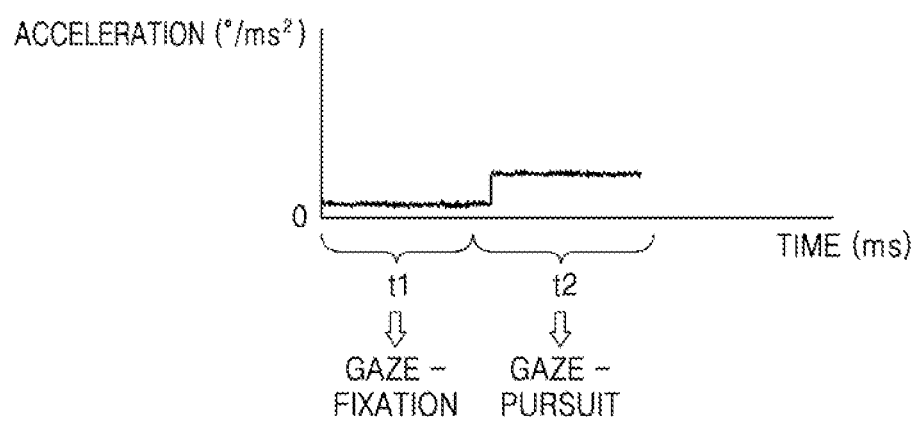
FIG. 12C is a diagram illustrating an example in which an eye movement state is identified based on an eye movement speed according to an embodiment.

FIG. 12A is a diagram illustrating an example of a gaze movement of a user according to an embodiment of the disclosure. FIG. 12B is a diagram illustrating an example in which an eye movement state is identified based on eye movement acceleration according to an embodiment of the disclosure. FIG. 12C is a diagram illustrating an example in which an eye movement state is identified based on an eye movement speed according to an embodiment of the disclosure.

FIG. 12A illustrates a case in which when the user is looking at a third object 1201, and the third object 1201 moves in the right direction, the gaze of the user moves along with the moving third object 1201.

FIGS. 12B and 12C are graphs respectively showing an acceleration and speed value calculated in the case of FIG. 12A.

The processor 120 of the electronic device 100 may identify, after calculating the eye movement acceleration by using the gaze information obtained through the eye-tracking sensor 160, that the acceleration in the time section t1 and the time section t2 is close to 0°/ms², i.e., less than or equal to the preset acceleration threshold value.

Moreover, the processor 120 may identify, after calculating the eye movement speed by using the gaze information obtained through the eye-tracking sensor 160, that the speed is close to 0°/ms in the time section t1, i.e., less than or equal to the predetermine speed threshold value, and that the movement speed is greater than the predetermined speed threshold value in the time section t2. Accordingly, the processor 120 may identify that the eyes are in the fixation state in the time section t1 and in the pursuit state in the time section t2.

The processor 120 may adjust the photographing direction of the camera module 175 to obtain an image taken without shaking while sensing the movement of the electronic device 100 in the time section t1 when the camera module 175 is directed to the third object 1201 at which the user is gazing.

Furthermore, in the time section t2 in which the eyes are in the pursuit state, the processor 120 may change the photographing direction according to the moving gaze direction of the user and simultaneously adjust the photographing direction of the camera module 175 to obtain an image taken without shaking while sensing the movement of the electronic device 100.

Figure 13:
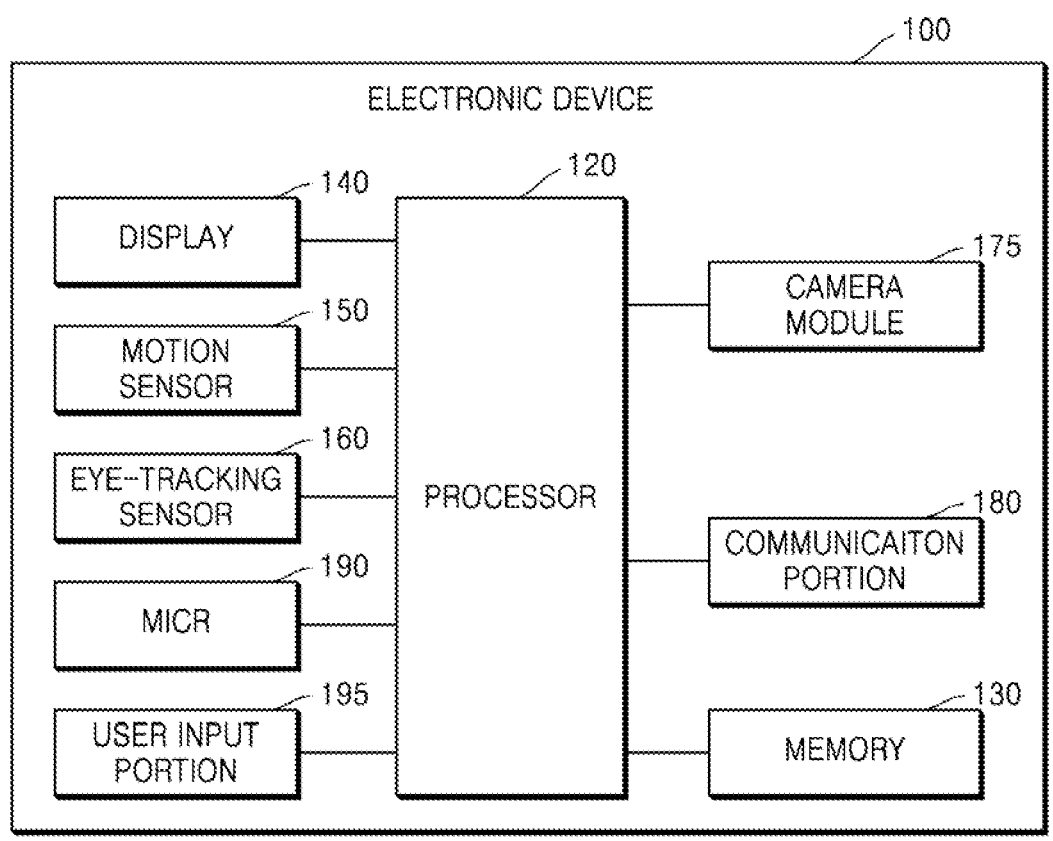
FIG. 13 is a block diagram of an electronic device according to an embodiment.

FIG. 13 is a block diagram of an electronic device according to an embodiment of the disclosure.

According to an embodiment of the disclosure, the electronic device 100 may be an AR device having a communication function and data processing function and providing an AR image, but the disclosure is not limited thereto.

As illustrated in FIG. 13, the electronic device 100 according to an embodiment of the disclosure may include the eye-tracking sensor 160, the motion sensor 150, the camera module 175, the memory 130, the processor 120, a display 140, a communication portion 180, a microphone 190, and a user input portion 195.

However, the components illustrated in FIG. 13 are not essential components of the electronic device 100. The electronic device 100 may be implemented by more or fewer components than the components illustrated in FIG. 13.

As the operations of the eye-tracking sensor 160, the motion sensor 150, the camera module 175, the memory 130, and the processor 120 are already described with reference to FIG. 2, any redundant description thereof is omitted.

The display 140 according to an embodiment of the disclosure may output information processed by the processor 120. For example, the display 140 may display a virtual object.

According to an embodiment of the disclosure, the display 140 may provide an AR image. The display 140 according to an embodiment of the disclosure may include a waveguide and a display module. The waveguide may be made of a transparent material showing a partial area of a rear surface of a wearable device 1 worn by the user. The waveguide may include a single or multi-layer structure plate formed of a transparent material in which light may be reflected and propagated. The waveguide may face an exit surface of a display module and may receive light of a projected virtual image. The transparent material may refer to a material capable of transmitting light, may not have 100% transparency, and may have a certain color.

According to an embodiment of the disclosure, as the waveguide is formed of a transparent material, the user may not only see a virtual object of a virtual image through the display 140 but also an actual outside scene, and thus the waveguide may be referred to as a see-through display. The display 140 may provide an AR image by outputting a virtual object of a virtual image through the waveguide.

The communication portion 180 may include one or more components configured to facilitate communication between the electronic device 100 and an external device 200 (FIG. 14) or a server.

For example, the communication portion 180 may include a near field communication portion and a mobile communication portion.

The near field communication portion may include a bluetooth portion, a near field communication portion (NFC/RFID portion), a WLAN (WiFi) communication portion, a zigbee communication portion, an infrared data association (IrDA) communication portion, a ultra wideband (UWB) communication portion, an ant+ communication portion, etc.; however, the disclosure is not limited thereto.

The mobile communication portion may receive and transmit a wireless signal from and to at least one of a base station, an external terminal, and a server on a mobile communication network. The wireless signal may include a voice call signal, a video call signal, or data in various forms according to receipt and transmission of text/multimedia message.

The electronic device 100 according to an embodiment of the disclosure may transmit the gaze information and the motion information to the external device 200 (FIG. 14) through the communication portion 180. Accordingly, the external device 200 may determine the photographing control information based on the gaze information and the motion information.

Moreover, according to an embodiment of the disclosure, the electronic device 100 may receive the photographing control information determined at the external device 200 and control the photographing direction of the camera module 175 based on the received photographing control information.

According to the embodiment, the electronic device 100 may transmit an image obtained by using the camera module 175 to the external device 200. The external device 200 may store the received image.

The microphone 190 may receive an external sound signal and process it into electrical audio data. For example, the microphone 190 may receive a sound signal from an external device or a speaker. The microphone 190 may use various noise removing algorithms to remove noise generated in the process of receiving the external sound signal. The microphone 190 may receive a voice input of the user to control the electronic device 100.

The user input portion 195 may be an input tool to which the user inputs data to control the electronic device 100. For example, the user input portion 195 may include at least one of a key pad, a dome switch, a touch pad (capacitive type, resistive type, infrared-sensitive type, surface ultrasonic conductive type, integral tension measurement type, piezo effect type, etc.), a jog wheel, and a jog switch, etc.; however, the disclosure is not limited thereto.

The user input portion 195 may receive a user input for capturing an image of the periphery of the electronic device 100 by using the camera module 175. Moreover, the user input portion 195 may receive a user input to receive a service from the electronic device 100 or a server based on the captured image.

Figure 14:
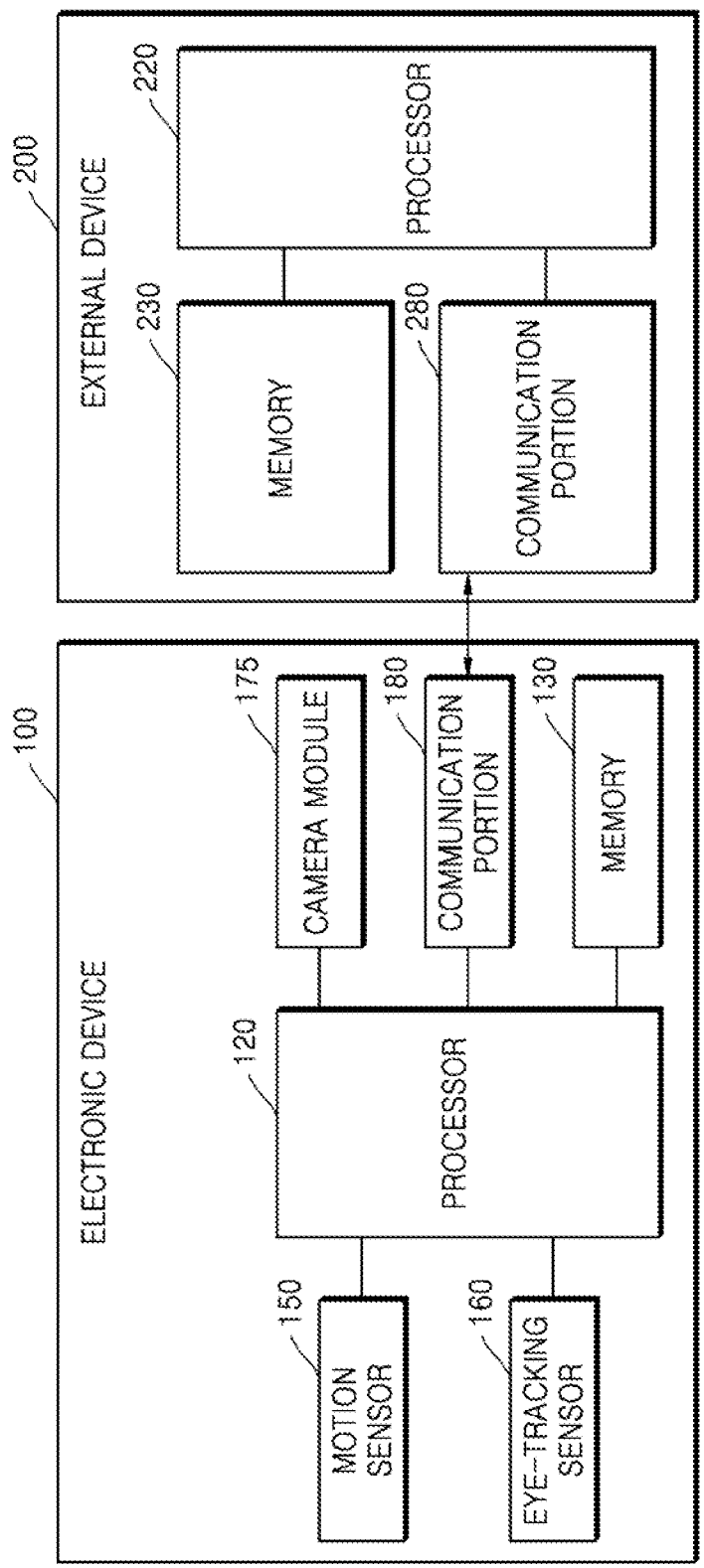
FIG. 14 is a block diagram of an electronic device and an external device according to an embodiment.

FIG. 14 is a block diagram of an electronic device and an external device according to an embodiment of the disclosure.

According to an embodiment of the disclosure, the electronic device 100 may operate in association with the external device 200. The electronic device 100 may transmit the gaze information and the motion information to the external device 200, and the external device 200 may determine the photographing control information by using the gaze information and the motion information, and provide the photographing control information to the electronic device 100.

The components of the electronic device 100 illustrated in FIG. 14 may correspond to the components of the electronic device 100 illustrated in FIG. 13, and thus, description thereon is omitted.

The external device 200 illustrated in FIG. 14 may include a processor 220, a memory 230, and a communication portion 280. However, the components illustrated in FIG. 14 are not essential components of the external device 200. The external device 200 may be implemented by more or fewer components than the components illustrated in FIG. 14.

The processor 220 according to an embodiment of the disclosure may control the external device 200 in general. The processor 220 according to an embodiment of the disclosure may execute one or more programs stored in the memory 230.

The memory 230 according to an embodiment of the disclosure may store data, programs, and applications for driving and controlling the external device 200. The programs stored in the memory 230 may include one or more instructions. The programs (one or more instructions) or applications stored in the memory 230 may be executed by the processor 220.

The memory 230 according to an embodiment of the disclosure may store programs for processing and control by the processor 220. The programs stored in the memory 230 may be classified into a plurality of modules according to their function. For example, a software module may be stored in the memory 230 of the external device 200 so that the operations performed by the eye movement identification module 131 and the photographing direction determination module 132 of the electronic device 100 may be performed by the processor 220 of the external device 200.

In addition, the memory 230 may store the gaze information and the motion information received from the electronic device 100. Moreover, the memory 230 may store an image obtained by the camera module 175 and received from the electronic device 100.

The communication portion 280 may include one or more components configured to facilitate communication between the external device 200 and the electronic device 100 or between the external device 200 and a server.

For example, the communication portion 280 may include a near field communication portion and a mobile communication portion.

The near field communication portion may include a bluetooth portion, a near field communication portion (NFC/RFID portion), a WLAN (WiFi) communication portion, a zigbee communication portion, an infrared data association (IrDA) communication portion, a ultra wideband (UWB) communication portion, an ant+ communication portion, etc.; however, the disclosure is not limited thereto.

The mobile communication portion may receive and transmit a wireless signal from and to at least one of a base station, an external terminal, and a server on a mobile communication network. The wireless signal may include a voice call signal, a video call signal, or data in various forms according to receipt and transmission of text/multimedia message.

The external device 200 according to an embodiment of the disclosure may receive the gaze information and the motion information from the electronic device 100 through the communication portion 280. Accordingly, the processor 220 of the external device 200 may determine the photographing control information based on the gaze information and the motion information. Moreover, the external device 200 may transmit the determined photographing control information to the electronic device 100 through the communication portion 280.

The external device 200 according to an embodiment of the disclosure may receive an image captured from the electronic device 100 through the communication portion 280. Accordingly, the external device 200 may store the received image in the memory 230.

The embodiments can be written as computer programs and can be implemented in general-use digital computers that execute the programs using a computer-readable recording medium. Moreover, the data structure used in the embodiments may be recorded to the computer-readable recording medium through various tools. The embodiment may also be implemented in the form of a computer-readable recording medium including computer-executable commands, such as a computer module. When software modules or algorithms are involved, these software modules may be stored as program instructions or computer-readable codes executable on a processor on a computer-readable recording medium.

The computer-readable recording medium may be any recording medium which can be accessed by a computer, and include volatile and non-volatile media, and separable and non-separable media. Examples of the computer-readable recording medium may include magnetic storage media (e.g., ROM, RAM, floppy disks, hard disks, etc.), and optical recording media (e.g., CD-ROMs, digital versatile disks (DVDs), etc.); however, the disclosure is not limited thereto. Further, the computer-readable recording media may include both of computer storage media and communication media.

The computer-readable recording media can also be distributed over network-coupled computer systems so that data, for example, program instructions and codes stored in the distributed recording media are executed by at least one computer.

The particular implementations shown and described herein are illustrative examples of embodiments and are not intended to otherwise limit the scope of the disclosure in any way. For the sake of brevity, conventional electronics, control systems, software development and other functional aspects of the systems may not be described in detail.

The above descriptions of the disclosure are provided merely as an example, and a person skilled in the art to which the disclosure pertains may understand that the embodiments can be easily modified into other specific forms without changing technical ideas or essential technical features of the disclosure. Therefore, it should be understood that the embodiments described above are provided as an example in every aspects, and thus do not pose a limitation on the disclosure. For example, each component described as a single type component may be implemented in a dispersed manner, and similarly to this, components described as being dispersed may be implemented in an integrated manner.

The use of any and all examples, or exemplary language (e.g., "such as") provided herein, is intended merely to better illuminate embodiments and does not pose a limitation on the scope of embodiments unless otherwise claimed.

Moreover, no item or component is essential to the practice of embodiments unless the element is specifically described as "essential" or "critical."

It will be understood by those skilled in the art that various changes in form and details may be made therein without departing from the spirit and scope of embodiments as defined by the appended claims.

As embodiments allows for various changes and numerous embodiments, example embodiments will be illustrated in the drawings and described in detail in the written description. However, this is not intended to limit embodiments to particular modes of practice, and it is to be appreciated that all changes, equivalents, and substitutes that do not depart from the spirit and technical scope of the disclosure are encompassed in embodiments. Thus, the embodiments should be considered in a descriptive sense and not for purposes of limitation.

The scope of the disclosure is defined not by the detailed description of embodiments but by the appended claims, and may be construed as encompassing all modifications or adaptions derived from the meaning and scope of the claims and their equivalent concepts.

In addition, the terms " . . . part," "module," etc., described in the specification refer to a unit for processing at least one function or operation, which can be implemented by a hardware or a software, or a combination of a hardware and a software.

The " . . . part" and "module" may be stored in an addressable storage medium and also be implemented by a program executable by a processor.

For example, " . . . part" and "module" may be implemented by components, such as software components, object-oriented software components, class components, and task components, processes, functions, attributes, procedures, sub-routines, segments of program codes, drivers, firmwares, micro-codes, circuits, data, databases, data structures, tables, arrays, and variables.

Throughout the disclosure, the expressions "A may include at least one of a1, a2 or a3" and "A may include at least one from among a1, a2, and a3" indicate that A may include only a1, only a2, only a3, both a1 and a2, both a1 and a3, both a2 and a3, all of a1, a2, and a3, or variations thereof.

Such expressions are not intended to limit the elements constituting A to be a1, a2, or a3. Accordingly, the above expressions should not be interpreted exclusively as meaning that no other elements than a1, a2, and a3 can constitute A.

Also, the aforementioned expressions mean that A may include only a1, only a2, or only a3. The elements constituting A are not necessarily determined selectively in a certain group. For example, the above expressions should not be construed as meaning that a1, a2, or a3 selected from a group essentially including a1, a2, and a3 constitutes A.

The invention claimed is:

1. An electronic device worn by a user, the electronic device comprising:
a camera module capable of changing a photographing direction;
a motion sensor configured to obtain motion information about the electronic device;
an eye-tracking sensor configured to obtain gaze information about eyes of the user;
a memory storing one or more instructions; and
a processor configured to execute the one or more instructions,
wherein the processor is configured to, by executing the one or more instructions:
determine the photographing direction based on the gaze information,
determine photographing control information for changing the photographing direction of the camera module to obtain an image captured without shaking, based on the motion information,
control the camera module to change the photographing direction, based on the determined photographing control information, and
obtain the image captured by the camera module based on the changed photographing direction, and
wherein the processor is further configured to, by executing the one or more instructions:
determine that the eyes of the user are in a state in which the eyes are not looking at a particular object, and
determine the photographing control information based on the motion information and without considering the gaze information.

2. The electronic device of claim 1, wherein the processor is further configured to, by executing the one or more instructions, identify an eye movement state of the user based on the obtained gaze information, and determine the photographing control information based on the identified eye movement state.

3. The electronic device of claim 2, wherein the processor is further configured to, by executing the one or more instructions, calculate an eye movement acceleration based on the gaze information, and identify the eye movement state based on a result of comparing the calculated eye movement acceleration with a predetermined acceleration threshold value.

4. The electronic device of claim 3, wherein the processor is further configured to, by executing the one or more instructions:
determine that the eyes of the user are in the state in which the eyes are not looking at the particular object when the calculated eye movement acceleration is greater than the predetermined acceleration threshold value.

5. The electronic device of claim 3, wherein the processor is further configured to, by executing the one or more instructions:
determine that the eyes of the user are in a state in which the eyes are looking at a particular object when the calculated eye movement acceleration is less than or equal to the predetermined acceleration threshold value, and
determine the photographing control information based on the gaze information and the motion information.

6. The electronic device of claim 1, wherein the motion information comprises information about at least one from among a direction, an angle, and a speed of movement of the electronic device.

7. The electronic device of claim 1, wherein the photographing control information comprises information about at least one from among a direction, an angle, and a speed of rotation of the camera module.

8. The electronic device of claim 1, wherein the processor is further configured to, by executing the one or more instructions, determine the photographing control information such that the photographing direction of the camera module is changed to an opposite direction of a movement direction of the electronic device, based on the motion information.

9. An operating method of an electronic device worn by a user, the operating method comprising:
determining a photographing direction of a camera module based on gaze information about eyes of the user;
determining photographing control information for changing the photographing direction of the camera module to obtain an image captured without shaking, based on motion information about the electronic device;
controlling the camera module to change the photographing direction, based on the determined photographing control information;
obtaining the image captured by the camera module based on the changed photographing direction,
wherein the identifying of the eye movement state further comprises determining that the eyes of the user are in a state in which the eyes are not looking at a particular object, and
wherein when the eyes of the user are in the state in which the eyes are not looking at the particular object, the determining of the photographing control information comprises determining the photographing control information based on the motion information and without considering the gaze information.

10. The operating method of claim 9, wherein the determining of the photographing control information comprises:
identifying an eye movement state of the user based on the obtained gaze information; and
determining the photographing control information based on the identified eye movement state.

11. The operating method of claim 10, wherein the identifying of the eye movement state comprises:
calculating an eye movement acceleration based on the gaze information; and identifying the eye movement state based on a result of comparing the calculated eye movement acceleration with a predetermined acceleration threshold value.

12. The operating method of claim 11, wherein the identifying of the eye movement state further comprises determining that the eyes of the user are in the state in which the eyes are not looking at the particular object when the calculated eye movement acceleration is greater than the predetermined acceleration threshold value.

13. The operating method of claim 11, wherein the identifying of the eye movement state further comprises determining that the eyes of the user are in a state in which the eyes are looking at a particular object when the calculated eye movement acceleration is less than or equal to the predetermined acceleration threshold value, and the determining of the photographing control information comprises determining the photographing control information based on the gaze information and the motion information when the eyes of the user are in the state in which the eyes are looking at the particular object.

14. The operating method of claim 9, wherein the determining of the photographing control information comprises determining the photographing control information such that the photographing direction of the camera module is changed to an opposite direction of a movement direction of the electronic device, based on the motion information.

15. The operating method of claim 9, wherein the motion information about the electronic device comprises at least one of a direction, an angle or a speed of movement of the electronic device.

16. The operating method of claim 9, wherein the photographing control information comprises at least one of a direction, an angle, or a speed of rotation of the camera module.

17. A non-transitory computer-readable recording medium storing a program that is executed by a processor to perform a method comprising:
  determining a photographing direction of a camera module based on gaze information about eyes of a user;
  determining photographing control information for changing the photographing direction of the camera module to obtain an image captured without shaking, based on motion information about the electronic device worn by the user;
  controlling the camera module to change the photographing direction, based on the determined photographing control information;
  obtaining the image captured by the camera module based on the changed photographing direction;
  determining that the eyes of the user are in a state in which the eyes are not looking at a particular object; and
  determining the photographing control information based on the motion information and without considering the gaze information.

* * * * *